(12) United States Patent
Saito et al.

(10) Patent No.: US 11,759,864 B2
(45) Date of Patent: *Sep. 19, 2023

(54) ADDITIVE MANUFACTURING APPARATUS

(71) Applicant: Sodick Co., Ltd., Kanagawa (JP)

(72) Inventors: Tsuyoshi Saito, Kanagawa (JP); Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,699

(22) Filed: Oct. 4, 2021

(65) Prior Publication Data
US 2022/0118522 A1   Apr. 21, 2022

(30) Foreign Application Priority Data

Oct. 20, 2020 (JP) .................................. 2020-175925
Dec. 15, 2020 (JP) .................................. 2020-207387

(51) Int. Cl.
| | |
|---|---|
| *B22F 12/67* | (2021.01) |
| *B33Y 30/00* | (2015.01) |
| *B22F 12/50* | (2021.01) |
| *B22F 12/00* | (2021.01) |
| *B29C 64/209* | (2017.01) |

(Continued)

(52) U.S. Cl.
CPC .............. *B22F 12/70* (2021.01); *B22F 10/73* (2021.01); *B22F 12/30* (2021.01); *B22F 12/38* (2021.01);
(Continued)

(58) Field of Classification Search
CPC ................ B29C 64/321; B29C 64/329; B29C 64/343; B29C 64/205; B29C 64/209; B29C 64/153; B29C 64/357; B29C 31/02; B29C 31/04; B29C 31/06; B29C 64/25; B29C 64/255; B29C 64/165; B22F 12/00; B22F 12/50;
(Continued)

(56) References Cited

U.S. PATENT DOCUMENTS

| 9,855,704 B2 * | 1/2018 | Miyano | B22F 3/105 |
| 10,173,263 B2 * | 1/2019 | Harajiri | B22F 12/50 |

(Continued)

FOREIGN PATENT DOCUMENTS

| CN | 109226762 A * | 1/2019 | ........... B22F 3/003 |
| CN | 210082420 | 2/2020 | |

(Continued)

OTHER PUBLICATIONS

Office Action of Japan Counterpart Application, with English translation thereof, dated Jul. 14, 2021, pp. 1-6.

*Primary Examiner* — Seyed Masoud Malekzadeh
*Assistant Examiner* — Jennifer L Groux
(74) *Attorney, Agent, or Firm* — JCIPRNET

(57) ABSTRACT

An additive manufacturing apparatus includes a chamber, a material layer former, and a guide member. The material layer former includes a base on which a molding region is present, a recoater head that moves on the base in a horizontal direction while discharging material, and a blade that levels the material to form a material layer. The guide member includes a feed chute that is configured to enable the material to be flowed, a shaft that is provided to shut a lower end portion of the feed chute and has a through hole, and a rotary actuator that rotates the shaft. The discharge of the material is switched to an on- or off-state by rotating the shaft.

4 Claims, 19 Drawing Sheets

(51) Int. Cl.
*B29C 64/321* (2017.01)
*B29C 64/25* (2017.01)
*B22F 12/70* (2021.01)
*B22F 12/90* (2021.01)
*B33Y 40/00* (2020.01)
*B22F 12/53* (2021.01)
*B22F 10/73* (2021.01)
*B22F 12/30* (2021.01)
*B22F 10/28* (2021.01)

(52) U.S. Cl.
CPC .............. *B22F 12/50* (2021.01); *B22F 12/53* (2021.01); *B22F 12/67* (2021.01); *B22F 12/90* (2021.01); *B29C 64/209* (2017.08); *B29C 64/25* (2017.08); *B29C 64/321* (2017.08); *B33Y 30/00* (2014.12); *B33Y 40/00* (2014.12); *B22F 10/28* (2021.01); *B22F 2201/10* (2013.01)

(58) Field of Classification Search
CPC .......... B22F 12/52; B22F 12/57; B22F 10/00; B22F 10/20; B22F 10/28; B22F 10/73; B22F 12/38; B22F 12/67; B65D 83/06; B33Y 30/00
See application file for complete search history.

(56) References Cited

U.S. PATENT DOCUMENTS

| | | | |
|---|---|---|---|
| 11,225,022 B2 * | 1/2022 | Rode | ............ B33Y 40/00 |
| 2001/0045678 A1 | 11/2001 | Kubo et al. | |
| 2016/0107232 A1 | 4/2016 | Okazaki et al. | |
| 2017/0014905 A1 * | 1/2017 | Kawada | ............ B29C 64/25 |
| 2017/0036404 A1 | 2/2017 | Rengers et al. | |
| 2017/0348771 A1 | 12/2017 | Kawada et al. | |
| 2017/0355136 A1 * | 12/2017 | Matsumoto | ........... B29C 64/153 |
| 2018/0015673 A1 * | 1/2018 | Lee | ............ B29C 64/393 |
| 2018/0021855 A1 | 1/2018 | De Lajudie et al. | |
| 2018/0214955 A1 * | 8/2018 | Kottilingam | ............ B22F 10/34 |
| 2019/0001413 A1 | 1/2019 | Golz et al. | |
| 2019/0070662 A1 | 3/2019 | Amaya et al. | |
| 2019/0299529 A1 * | 10/2019 | Hill | ............ B33Y 30/00 |
| 2019/0358948 A1 | 11/2019 | O'Neill et al. | |
| 2020/0230698 A1 | 7/2020 | De Lajudie et al. | |
| 2021/0001556 A1 | 1/2021 | Rengers et al. | |
| 2021/0178689 A1 * | 6/2021 | Ewald | ............ G01F 11/24 |
| 2021/0362419 A1 * | 11/2021 | Plummer | ............ B33Y 30/00 |
| 2022/0105570 A1 * | 4/2022 | Hazlewood | ............ B22F 10/85 |

FOREIGN PATENT DOCUMENTS

| | | | | |
|---|---|---|---|---|
| DE | 19530295 C1 * | 1/1997 | ............ B22F 3/004 | |
| JP | 2001334583 | 12/2001 | | |
| JP | 2016078375 | 5/2016 | | |
| JP | 6046534 | 12/2016 | | |
| JP | 2018506651 | 3/2018 | | |
| JP | 2019081264 | 5/2019 | | |
| KR | 101820754 B1 * | 1/2018 | | |
| WO | WO-2018227229 A1 * | 12/2018 | | |
| WO | WO-2019005042 A1 * | 1/2019 | ............ B29C 64/255 | |
| WO | WO-2019014257 A1 * | 1/2019 | | |
| WO | WO-2019191607 A1 * | 10/2019 | | |

\* cited by examiner

ADDITIVE MANUFACTURING APPARATUS

CROSS-REFERENCE TO RELATED APPLICATION

This application claims the priority benefit of Japanese Application Serial No. 2020-175925, filed on Oct. 20, 2020, and Japanese Application Serial No. 2020-207387, filed on Dec. 15, 2020. The entirety of each of the above-mentioned patent applications is hereby incorporated by reference herein and made a part of this specification.

BACKGROUND

Technical Field

The disclosure relates to an additive manufacturing apparatus.

Description of Related Art

Various methods are known as additive manufacturing methods for three-dimensional molded objects. For example, an additive manufacturing apparatus that implements powder bed fusion forms a material layer by leveling powder material in a chamber and irradiates the material layer with a laser beam or an electron beams to sinter or melt the material, and thereby forms a solidified layer. The formation of a material layer and a solidified layer is repeated to laminate a plurality of solidified layers, and thereby a desired three-dimensional molded object is produced.

A material layer former, for example, including a recoater head that discharges stored material, and a blade attached to the recoater head is used in forming the material layer. When the recoater head moves in the horizontal direction, the blade levels the material discharged from the recoater head, and thereby the material layer with a predetermined thickness is formed. During additive manufacturing, the recoater head is appropriately replenished with the material.

To prevent the material from flying up during the supply of the material to the recoater head, it is desirable to supply the material from a position relatively close to the recoater head via a guide member that guides the material. In addition, it is desirable for the guide member to have a discharge switching mechanism at a lower end portion of the guide member, which enables discharge of the material to be switched to an on- or off-state. U.S. Patent Application Publication No. US2016/0107232A1 discloses a material supply unit that supplies material to a recoater head. This material supply unit includes a main duct, an intermediate duct to which the material is supplied from the main duct, and a drive mechanism that causes the intermediate duct to move upward and downward. The material supply unit has the intermediate duct inserted into the recoater head to replenish the recoater head with the material via the main duct and the intermediate duct. An intermediate duct shutter as a shutter-type opening/closing device is provided at a lower end portion of the intermediate duct.

In the case in which such a shutter-type opening/closing device is used as a discharge switching mechanism of the guide member, the material is likely to be jammed. In addition, the shutter-type opening/closing device needs a certain degree of space in the vertical direction. Because the amount of the material held by the recoater head when the material is supplied from the guide member depends on the distance from the opening/closing position of the opening/closing device to the lower end of the recoater head, the maximum amount of the material held by the recoater head is relatively large if the material is supplied to the recoater head via the guide member with the shutter-type opening/closing device. For this reason, if it is desired to keep material contained in the recoater head in a small amount for the purpose of stabilizing a discharge amount of the material and avoiding clogging such as bridging or ratholing, a conventional guide member with the shutter-type opening/closing device is not likely to achieve the objective.

SUMMARY

According to an embodiment of the disclosure, an additive manufacturing apparatus including a chamber that covers a molding region in which a desired three-dimensional molded object is formed, a material layer former including a base on which the molding region is present, a recoater head that moves on the base in a horizontal direction while discharging material stored therein, and a blade that is attached to the recoater head to level the material to form a material layer, and a guide member including a feed chute that is open upward and downward which is configured to enable the material supplied from an outside of the chamber, a shaft that is provided to shut a lower end portion of the feed chute, extends in the horizontal direction, and has a through hole formed in a direction orthogonal to an axis, and a rotary actuator that rotates the shaft, in which discharge of material from the guide member to the recoater head is switched to an on- or off-state by rotating the shaft is provided.

DESCRIPTION OF THE EMBODIMENTS

Figure 1:
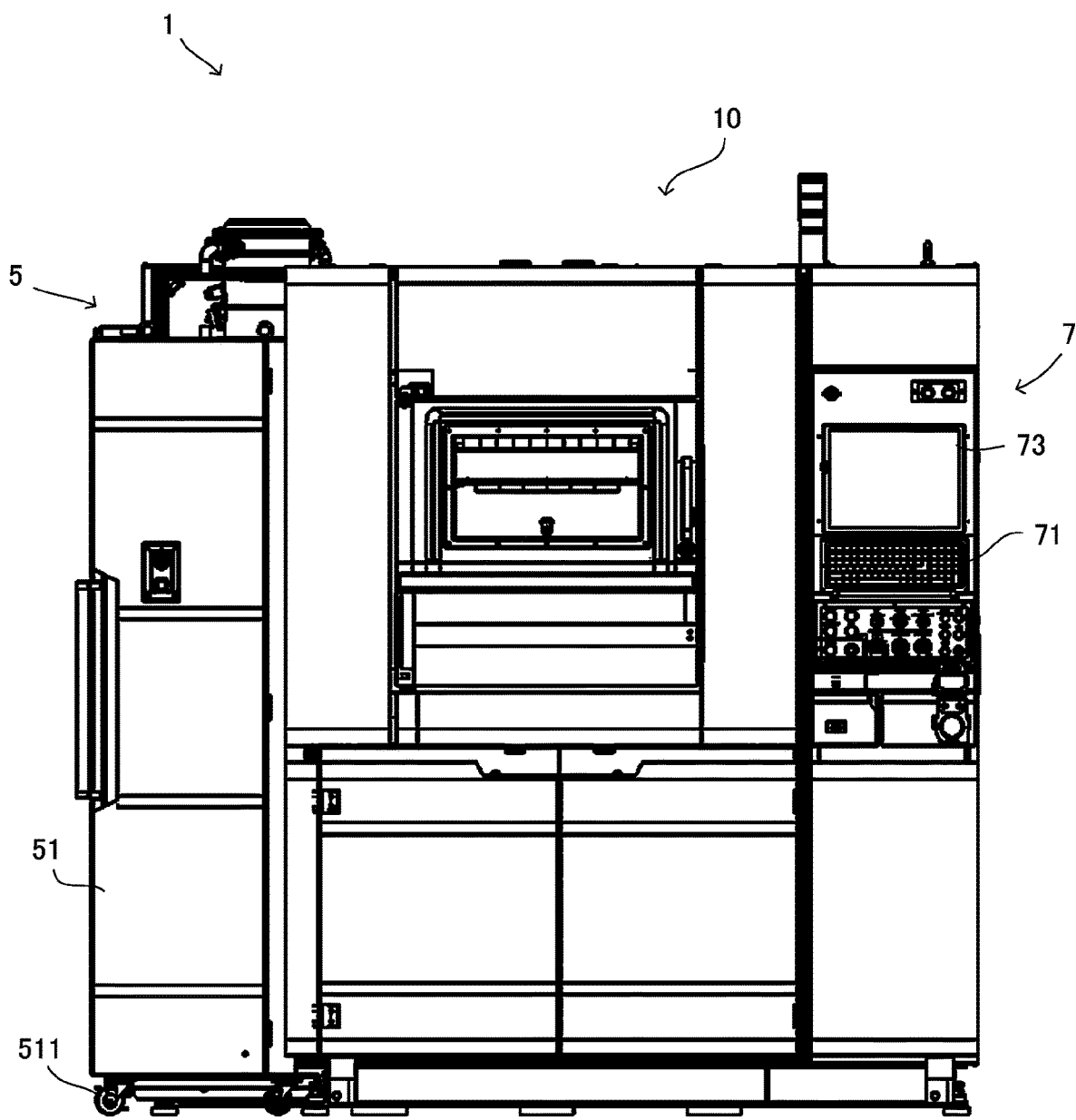
FIG. 1 is a front view of an additive manufacturing apparatus.

The disclosure has been conceived in view of the above circumstances and provides an additive manufacturing apparatus in which the material is less likely to be jammed in a discharge switching mechanism of a guide device that supplies the material to a recoater head and which can keep the material to be contained in the recoater head in a relatively small amount.

The additive manufacturing apparatus according to the disclosure includes, as a discharge switching mechanism that switches discharge of the material to an on- or off-state, the shaft that extends in the horizontal direction and has a through hole formed in the direction orthogonal to the axis and the rotary actuator that rotates the shaft. With the discharge switching mechanism, the material is relatively less likely to be jammed when discharge of the material is switched between the on- and off-state. In addition, because a material discharge position of the shaft can be set to be relatively low, if it is desired to keep material contained in the recoater in a small amount, the objective can be easily achieved.

An embodiment of the disclosure will be described using the drawings. Various modified examples described below may be implemented by optionally combining with the others. Further, hoses, pipes, and the like may be appropriately omitted in the drawings.

Figure 2:
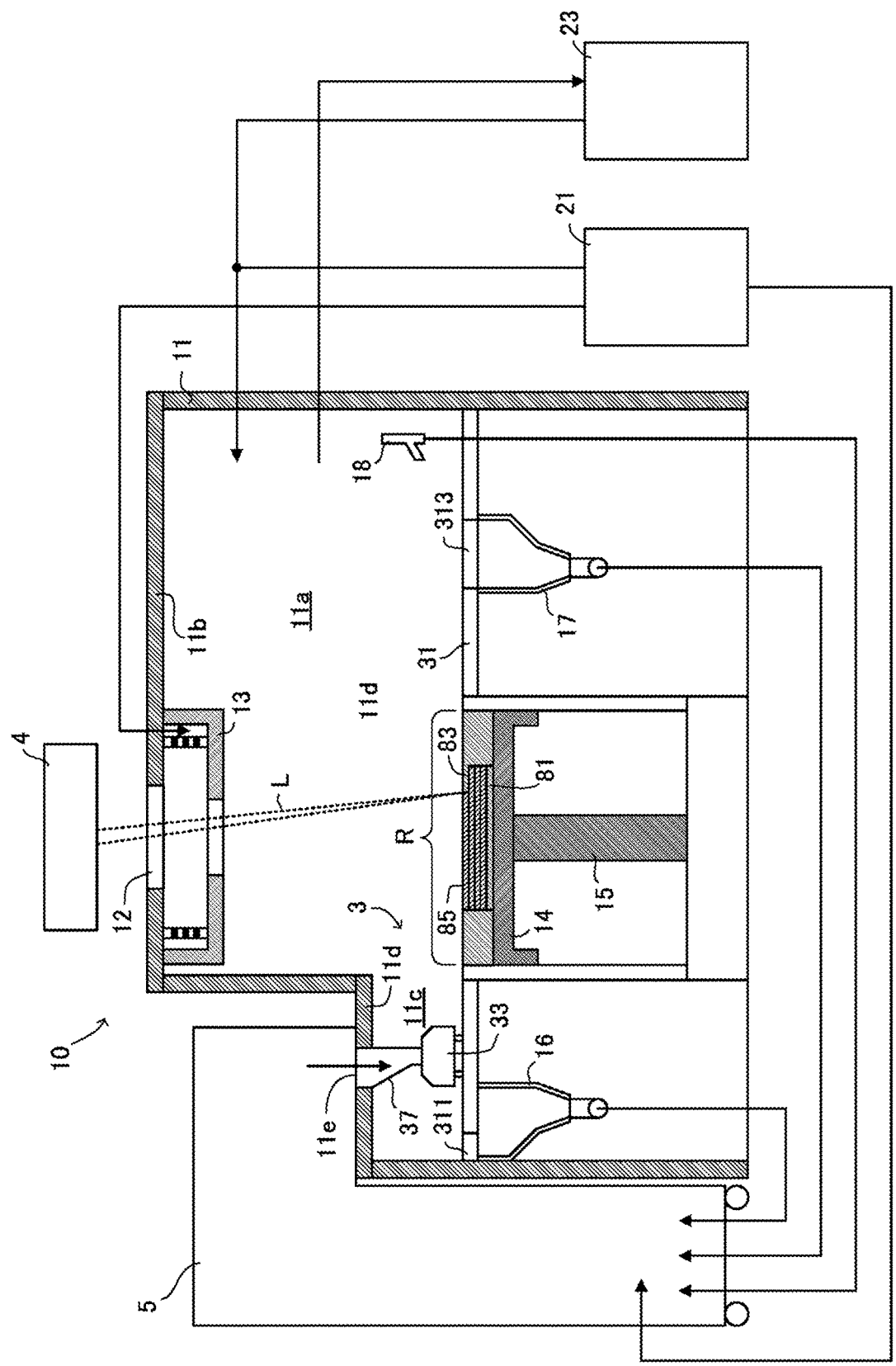
FIG. 2 is a schematic configuration view of an additive manufacturing apparatus body.

An additive manufacturing apparatus 1 according to the present embodiment includes an additive manufacturing apparatus body 10, an inert gas supplier 21, a fume collector 23, and a material supply unit 5 as illustrated in FIGS. 1 and 2.

The additive manufacturing apparatus body 10 performs additive manufacturing, specifically, powder bed fusion. In this specification, additive manufacturing is also referred to as molding. The additive manufacturing apparatus body 10 repeats formation of a material layer 83 and a solidified layer 85 to manufacture a desired three-dimensional molded object. The material layer 83 and the solidified layer 85 are formed for each divided layer, which is obtained by dividing data of the three-dimensional molded object at a predetermined thickness. The additive manufacturing apparatus body 10 includes a chamber 11, a guide member 37, a material layer former 3, an irradiation device 4, and a controller 7.

The chamber 11 is configured to be virtually sealed, and covers a molding region R that is a region in which the desired three-dimensional molded object is formed. The inside of the chamber 11 is filled with an inert gas at a predetermined concentration.

The material layer former 3 is provided inside the chamber 11 and forms a material layer 83 with a predetermined thickness. The material layer former 3 includes a base 31 including the molding region R and a recoater head 33 disposed on the base 31 and configured to be movable in a horizontal direction. A molding table 14 is disposed in the molding region R, and the molding table 14 is configured to be moved by a molding table driver 15 in a vertical direction. At the time of molding, a base plate 81 is disposed on the molding table 14, and a first material layer 83 is formed on the base plate 81.

A pair of discharge openings 311 and 313 are formed in the base 31 with the molding region R interposed therebetween, and a first discharge chute 16 and a second discharge chute 17 are provided below the discharge openings 311 and 313, respectively. Excess material fed from the discharge openings 311 and 313 is first retained in each of the first discharge chute 16 and the second discharge chute 17.

Figure 3:
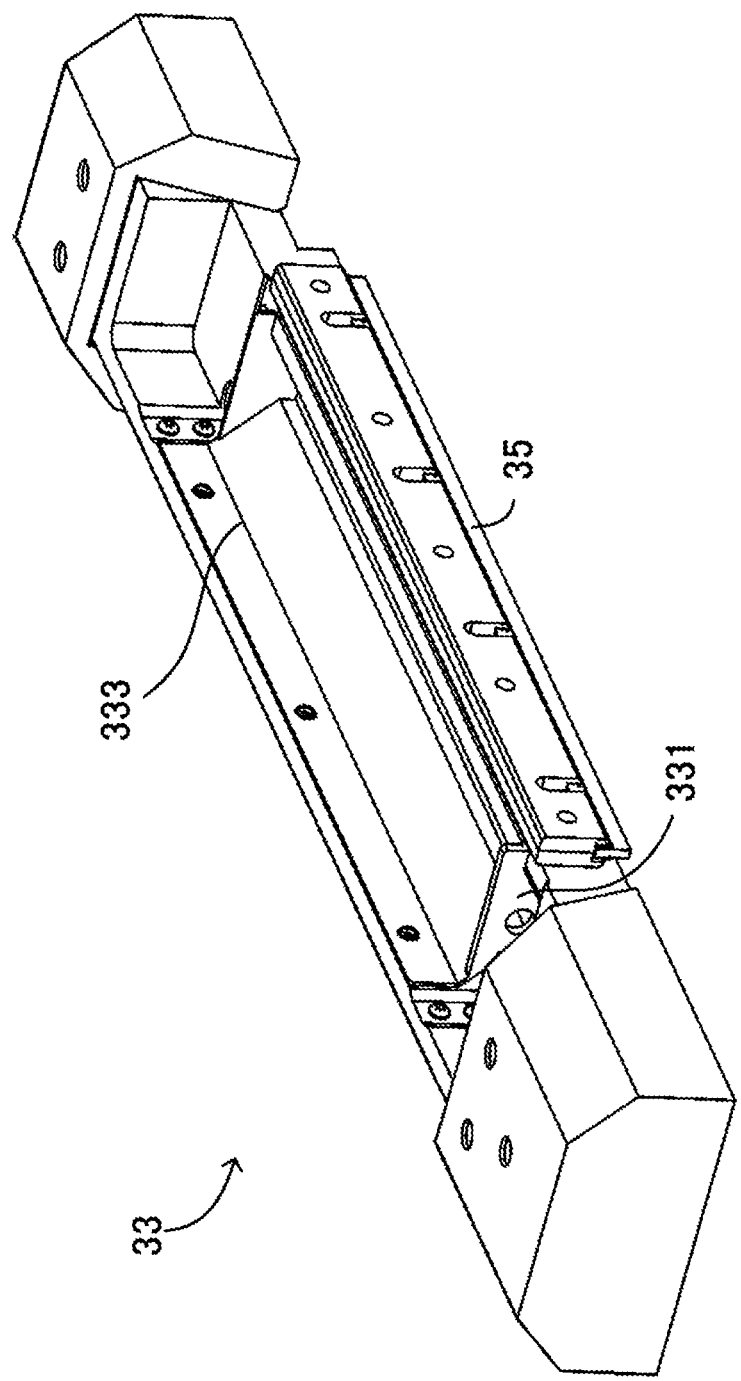
FIG. 3 is a perspective view taken from above a recoater head.
Figure 4:
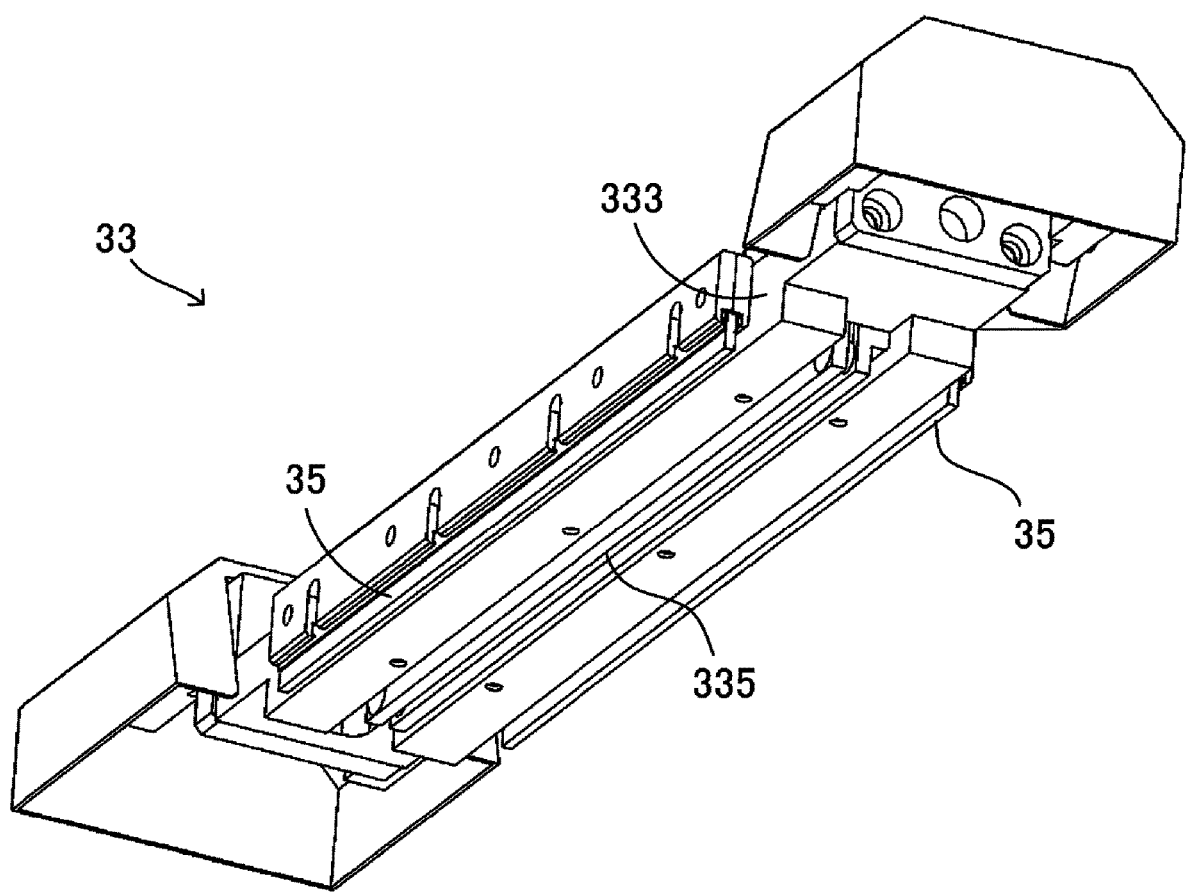
FIG. 4 is a perspective view taken from below the recoater head.

The recoater head 33 includes a material container 331, a material supply port 333, and a material discharge port 335 as illustrated in FIGS. 3 and 4. The material container 331 stores material. In the present embodiment, the material is, for example, a metal powder. The material supply port 333 is provided on an upper surface of the material container 331 and functions as a receiving port for material supplied to the material container 331. The material sent from the material supply unit 5 is fed to the material supply port 333 via the guide member 37. The material discharge port 335 is provided at a bottom of the material container 331 and discharges the material retained inside the material container 331. The material discharge port 335 has a slit shape extending in a horizontal direction orthogonal to the movement direction of the recoater head 33. A pair of blades 35 that levels the material to form the material layer 83 is provided on the sides of the recoater head 33. The recoater head 33 moves back and forth in the horizontal direction on the molding region R while discharging the material contained in the material container 331 from the material discharge port 335. At that moment, the blades 35 flatten the discharged material to form the material layer 83. The material layer 83 is made of the powder material.

Further, the excess material spread on the base 31 is extruded by the blades 35 as the recoater head 33 moves and discharged from the discharge openings 311 and 313. In addition, when it is desired to empty the inside of the material container 331 of the material, the recoater head 33 is moved over the discharge openings 311 and 313.

A suction nozzle 18 that can suction the material is disposed inside the chamber 11. In the present embodiment, a glove box, which is not illustrated, is provided in the chamber 11, and an operator can move the suction nozzle 18 to any place inside the chamber 11 through the glove box. The suction nozzle 18 enables the excess material inside the chamber 11 to be collected outside of the chamber 11. Mostly, unsolidified material on the molding table 14 or the base 31 is collected by the suction nozzle 18.

The chamber 11 includes a molding chamber 11a in which the molding region R is positioned and additive manufacturing is performed, and a replenish chamber 11c in which the guide member 37 is disposed and the material is supplied from the guide member 37 to the recoater head 33. The molding chamber 11a communicates with the replenish chamber 11c, and the recoater head 33 can reciprocate between the molding chamber 11a and the replenish chamber 11c.

Figure 5:
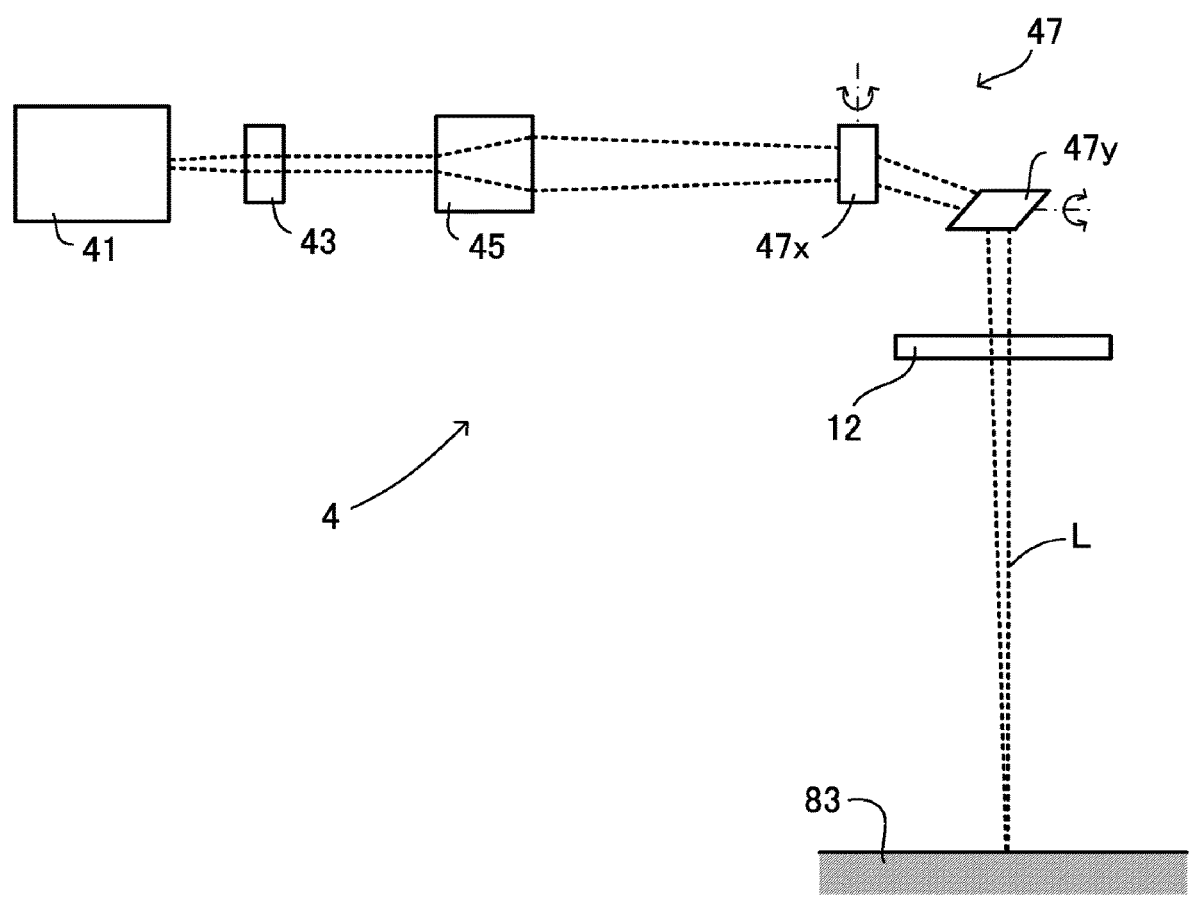
FIG. 5 is a schematic configuration view of an irradiation device.

The irradiation device 4 is provided above the chamber 11. The irradiation device 4 irradiates a predetermined irradiation region of the material layer 83 formed on the molding region R with a laser beam L to melt or sinter the material layer 83 at an irradiation position, and thereby the solidified layer 85 is formed. The irradiation region is present within the molding region R and approximately matches a region surrounded by the contour shape of the three-dimensional molded object for a predetermined divided layer. The irradiation device 4 includes a beam source 41, a collimator 43, a focus control unit 45, and a galvano scanner 47 as illustrated in FIG. 5.

The beam source 41 generates the laser beam L. Here, a type of the laser beam L is not limited as long as it can sinter or melt the material layer 83, and for example, the laser beam L is a fiber laser, a $CO_2$ laser, a YAG laser, a green laser, or a blue laser. The collimator 43 converts the laser beam L output by the beam source 41 into parallel light. The focus control unit 45 has a condensing lens and a motor that moves the condensing lens back and forth to adjust the laser beam L output by the beam source 41 to a desired spot diameter. The galvano scanner 47 is a scanner to scan the laser beam L, and includes a pair of galvano mirrors 47*x* and 47*y* and actuators each of which rotates the galvano mirrors 47*x* and 47*y*. The galvano mirrors 47*x* and 47*y* are controlled such that their rotation angles change according to a magnitude of a rotation angle control signal input from the controller 7 to two-dimensionally scan the laser beam L output from the beam source 41.

The laser beam L that has passed through the galvano mirrors 47*x* and 47*y* is transmitted through a window 12 provided in a top plate 11*b* of the molding chamber 11*a* and irradiates the material layer 83 formed in the molding region R. The window 12 is formed of material that can transmit the laser beam L. In a case in which the laser beam L is the fiber laser or the YAG laser, for example, the window 12 may be formed of quartz glass.

A contamination prevention device 13 is provided at the top plate 11*b* of the molding chamber 11*a* to cover the window 12. The contamination prevention device 13 prevents fumes generated during the formation of the solidified layer 85 from adhering to the window 12. The contamination prevention device 13 includes a cylindrical housing and a cylindrical diffusion member disposed within the housing. An inert gas supply space is provided between the housing and the diffusion member. In addition, an opening is provided at a bottom of the housing on an inner side of the diffusion member. Many pores are provided in the diffusion member, and clean inert gas supplied in the inert gas supply space passes through the pores to fill the clean chamber. Then, the clean inert gas filling the clean chamber is ejected downward from the contamination prevention device 13 through the opening. In this manner, the fumes are prevented from adhering to the window 12.

Further, the irradiation device may irradiate the material layer 83 with, for example, an electron beam to sinter or melt the layer to form the solidified layer 85. The irradiation device may include, for example, a cathode electrode that discharges electrons, an anode electrode that causes electrons to converge and accelerates them, a solenoid that forms a magnetic field to cause directions of the electron beam to converge to one direction, and a collector electrode that is electrically connected the material layer 83 that is an irradiation target. A voltage is applied between the collector electrode and the cathode electrode. In this variation, the cathode electrode and the cathode electrode serve as a beam source to generate the electron beam, and the solenoid serves as a scanner to scan the electron beam. That is, any device including a beam source that generates the laser beam L or the electron beam, and a scanner that scans the laser beam L or the electron beam may be used as the irradiation device.

The controller 7 controls the molding table 14, the material layer former 3 and the irradiation device 4 of the additive manufacturing apparatus body 10, the inert gas supplier 21, the fume collector 23, and the material supply unit 5. The controller 7 includes an arithmetic processor, a memory, a storage, an input device 71 that receives input from a keyboard, a touch panel, or the like and reads an external storage medium, and a display device 73 that displays operation screens and various parameters.

The additive manufacturing apparatus body 10 may include a cutting device with a rotating cutting tool such as an end mill and a shaping tool such as a tool bit. The cutting device may cut solidified layers 85 each time a predetermined number of solidified layers 85 are formed. In addition, the cutting device may cut and remove a protrusion created by a sputter adhering on an upper surface of the solidified layer 85. In addition, the cutting device may cut the solidified layers 85 to form a reference surface for secondary processing after the additive manufacturing is completed.

The inert gas supplier 21 supplies the inert gas at the predetermined concentration to the chamber 11. The inert gas supplier 21 is, for example, an inert gas generator that generates the inert gas from the air or a gas cylinder that stores the inert gas. In the present embodiment, the inert gas supplier 21 is, for example, a PSA-type nitrogen generator or a membrane separation-type nitrogen generator. Preferably, the inert gas supplier 21 supplies an inert gas to the material supply unit 5 as well as the chamber 11. In addition, preferably, the inert gas supplier 21 is capable of switching a supply amount of the inert gas. Further, in the disclosure, the inert gas is a gas that does not substantially react with the material layer 83 and the solidified layer 85, and an appropriate gas among nitrogen gas, argon gas, helium gas, and the like is selected according to the type of the material.

The fume collector 23 removes the fumes from the inert gas discharged from the chamber 11 and returns the fumes to the chamber 11. The fume collector 23 is, for example, an electrostatic precipitator or a filter.

Figure 6:
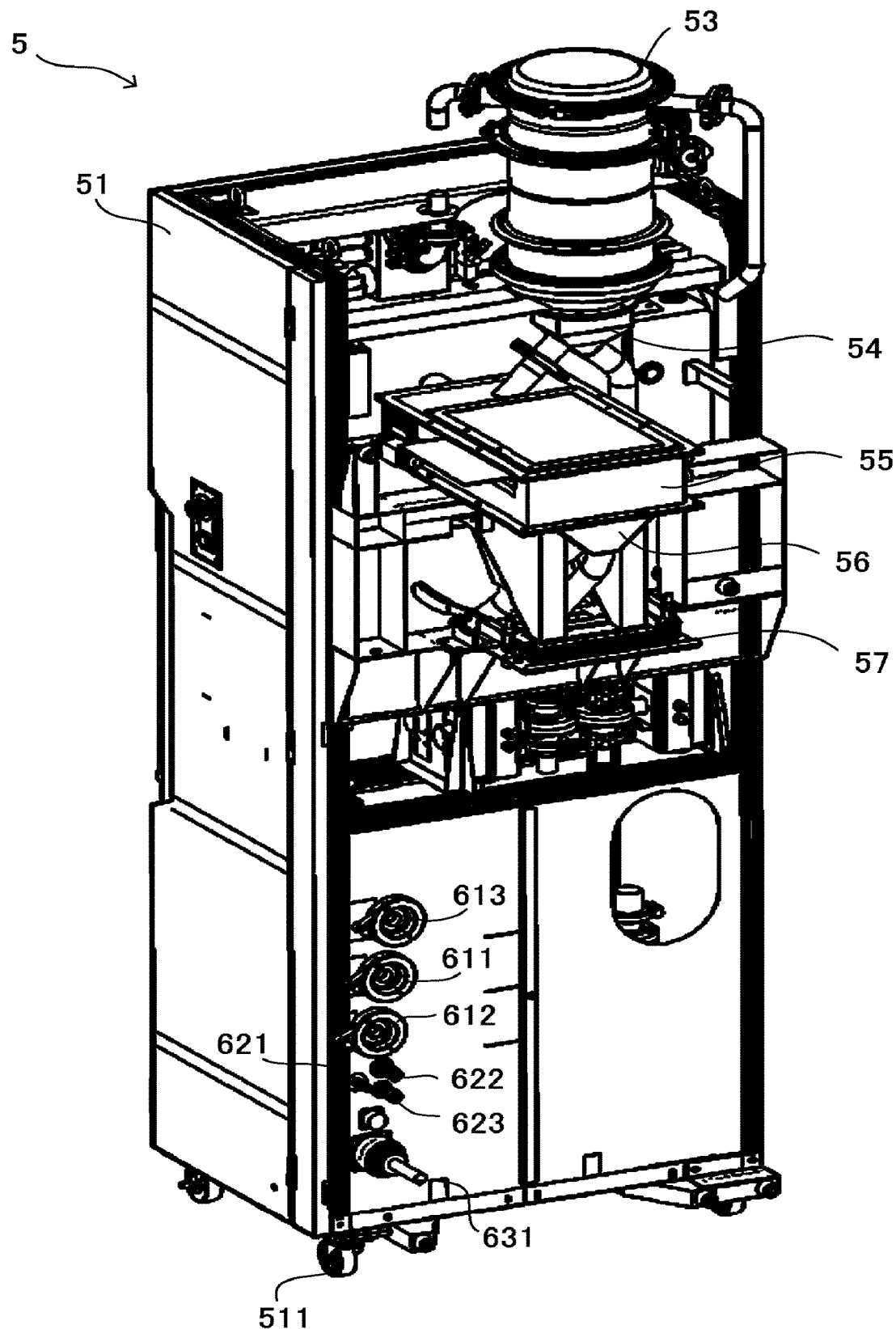
FIG. 6 is a perspective view of a material supply unit.
Figure 7:
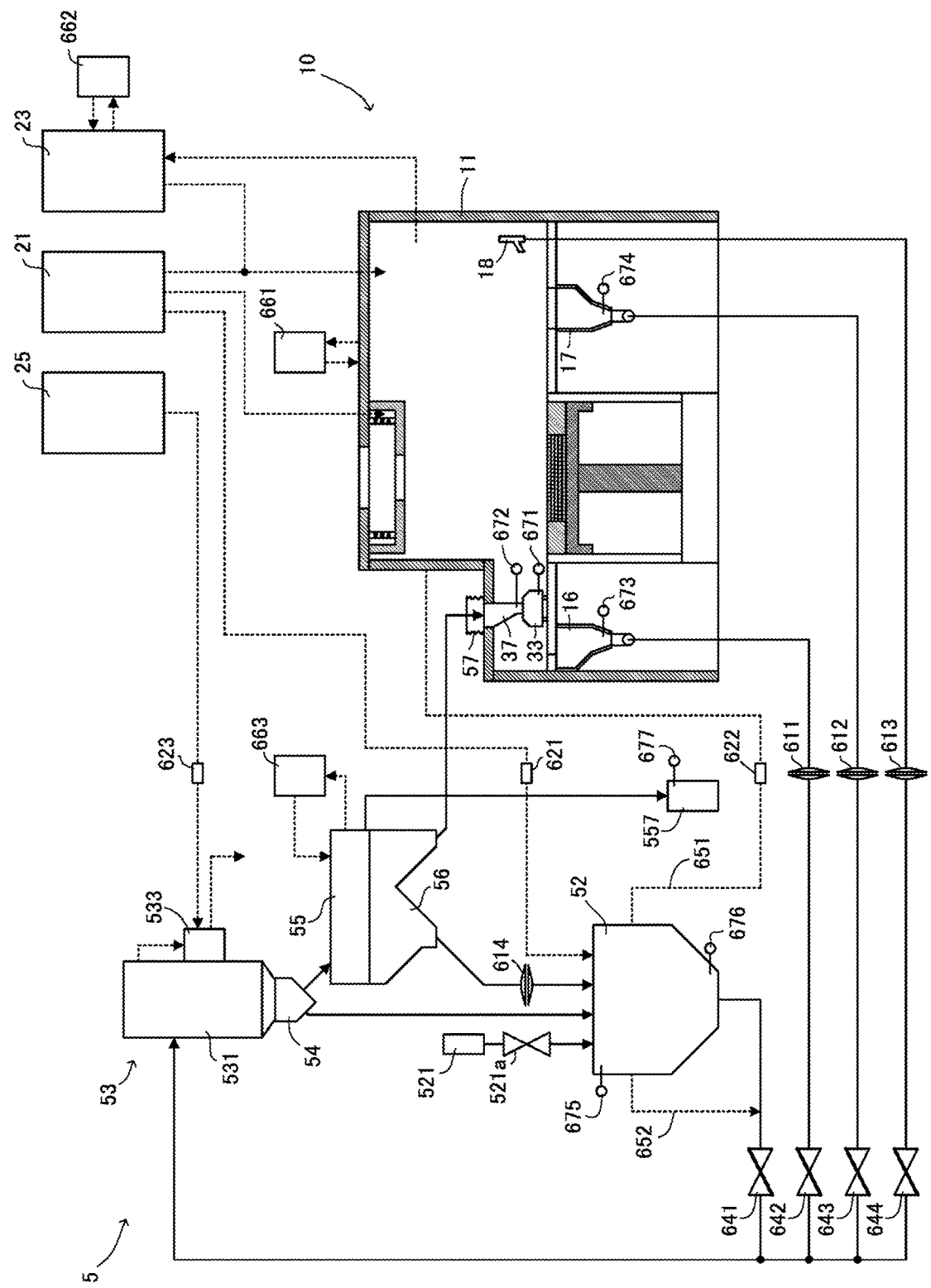
FIG. 7 is a schematic configuration view of the material supply unit.

The material supply unit 5 is any device that can supply a material to the material layer former 3 via the guide member 37. The material supply unit 5 of the present embodiment includes a cabinet 51, a material tank 52, a transporter 53, a first switching valve 54, a sieve 55, a second switching valve 56, and a connection member 57, as illustrated in FIGS. 6 and 7. Further, in FIG. 7, flows of the material are represented by solid-line arrows, and flows of gases are represented by dashed-line arrows. In addition, although not illustrated in FIG. 7, each part of the material supply unit 5 is electrically connected to the controller 7 via a connector 631.

In a case in which a plurality of types of material is used as material of the additive manufacturing apparatus 1, it is desirable to provide material supply units 5 for each of the material and switch between the material supply units 5 for each type of material. With this configuration, cleaning resulting from the switching of the material need only be performed on the additive manufacturing apparatus body 10, and thus change of the material can be made with no effort in a relatively short period of time.

The cabinet 51 can be moved by casters 511, and houses the material tank 52, the transporter 53, the first switching valve 54, the sieve 55, the second switching valve 56, and the connection member 57.

The material tank 52 stores the material to be used in additive manufacturing. When the material tank 52 is to be replenished with the material, for example, a material bottle 521 retaining the material is connected to the material tank 52 to perform replenishment of the material. The material bottle 521 is provided with an opening/closing valve 521*a*, and thus replenishment of the material can be performed by opening the opening/closing valve 521*a* after the connection to the material tank 52, without exposing the material. The material tank 52 and the transporter 53 are connected via a valve 641 that may be a butterfly valve.

Further, in order to prevent degradation of the material, it is desirable to fill a conveyance route of the material in the material supply unit 5 with the inert gas. In the present embodiment, the inert gas supplier 21 is also connected to the material tank 52 via a coupler 621 to supply the inert gas to the material tank 52 as well as the chamber 11. In addition, it is desirable to provide a first bypass 651 connected to the chamber 11 and the material tank 52 via a coupler 622, and a second bypass 652 connected to the material tank 52 and a pipe disposed between the material tank 52 and the transporter 53. The first bypass 651 and the second bypass 652 are pipelines in which an inert gas can flow. According to the above configuration, the chamber 11, the material tank 52, and the pipe between the material tank 52 and the transporter 53 have an equal pressure, and thus material can be favorably transported.

Figure 8:
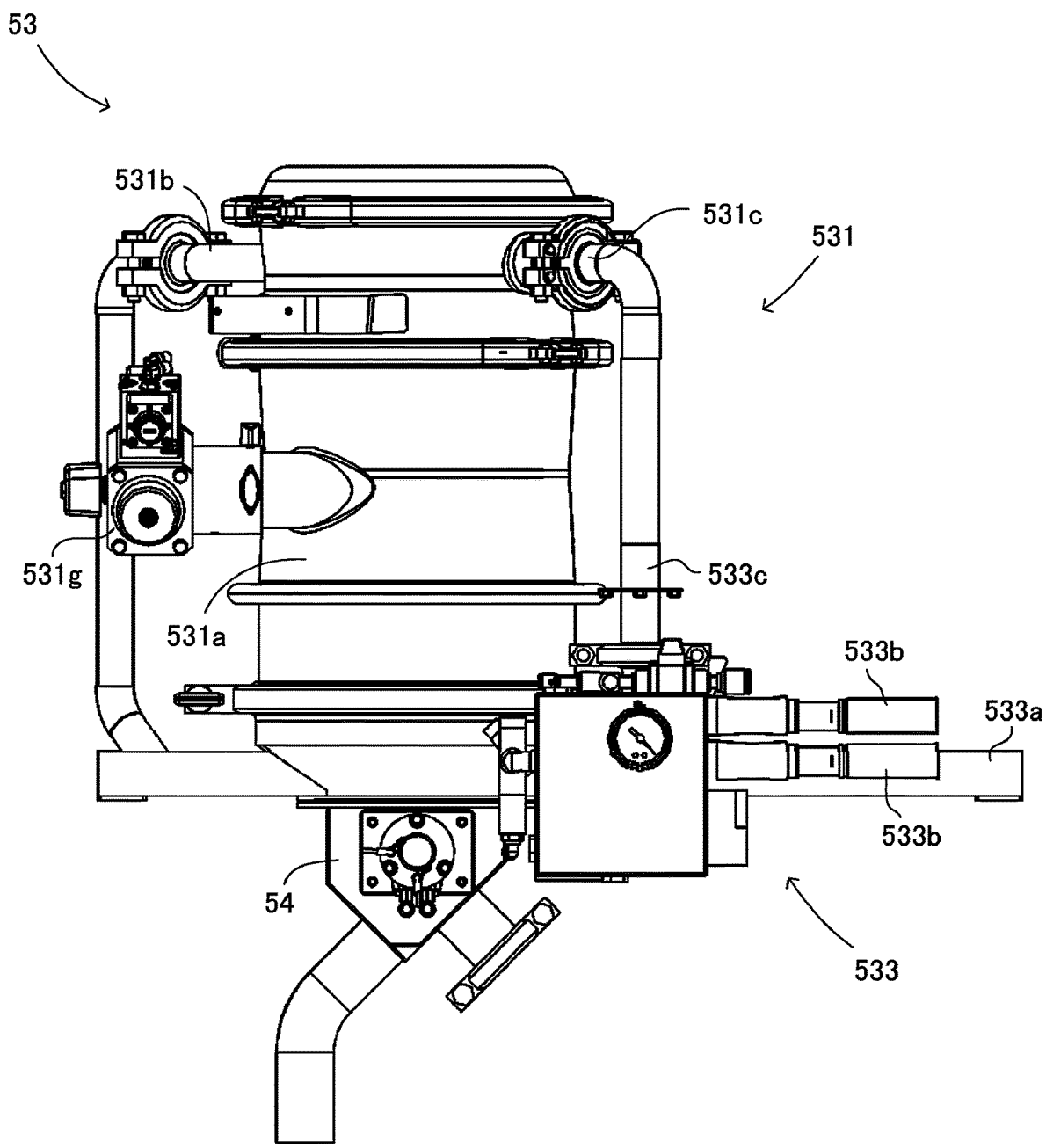
FIG. 8 is a side view of a transporter.
Figure 9:
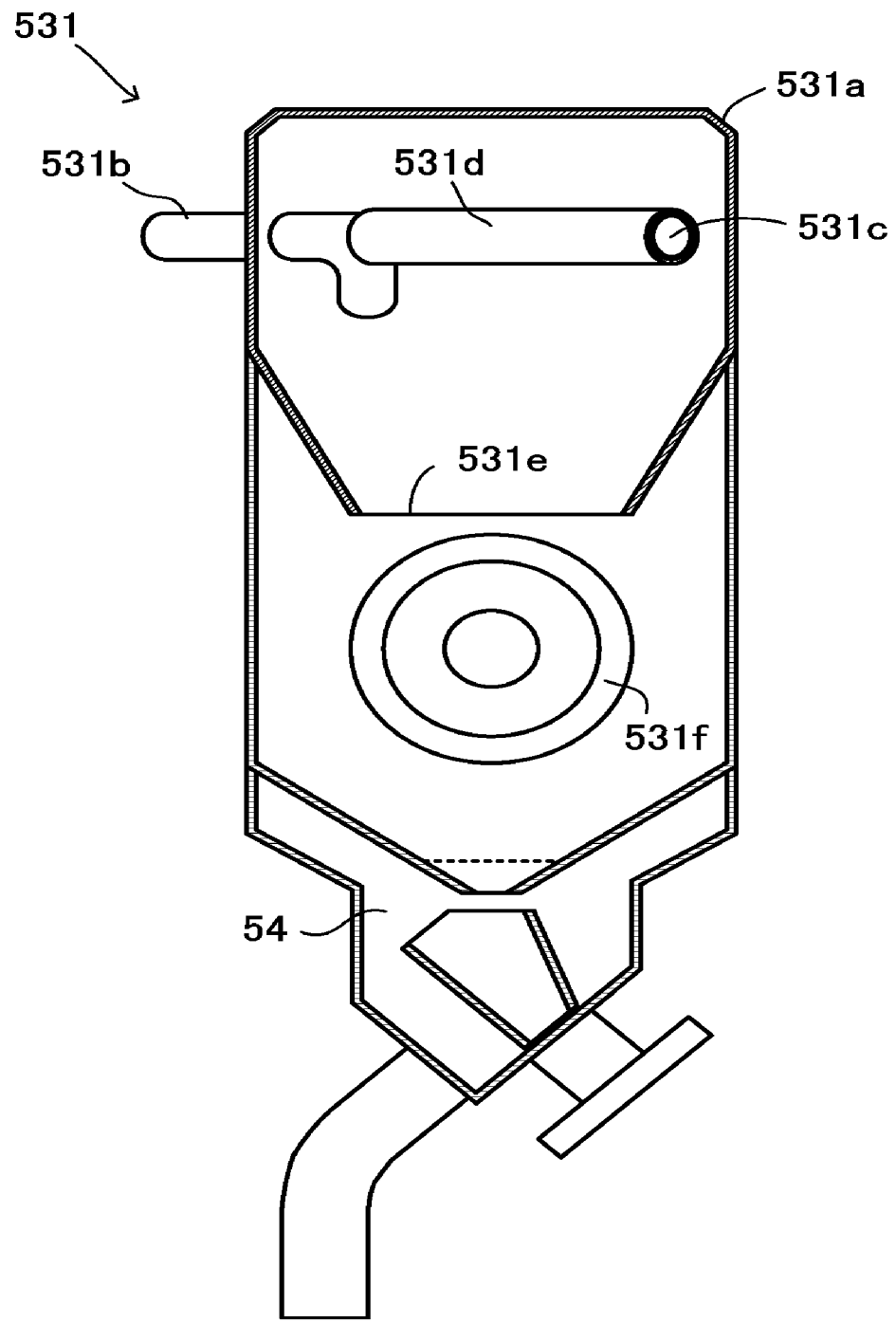
FIG. 9 is a cross-sectional view of the transporter.

The transporter 53 transports the material discharged from the chamber 11 and the material tank 52 to the highest level of the conveyance route of the material. The transporter 53 includes, for example, a vacuum conveyor 531 and an ejector 533 as illustrated in FIGS. 8 and 9. A pair of the first discharge chute 16 and the transporter 53, a pair of the second discharge chute 17 and the transporter 53, and a pair of the suction nozzle 18 and the transporter 53 are respectively connected via, for example, ferrules 611, 612, and 613, and valves 642, 643, and 644 that are, for example, butterfly valves.

The vacuum conveyor 531 includes a sealed vacuum container 531a. A supply pipe 531b and an exhaust pipe 531c are provided at an upper part of the vacuum container 531a, and a discharge port 531e is formed at a lower end of the vacuum container 531a. The supply pipe 531b is connected to the chamber 11 and the material tank 52. More specifically, the supply pipe 531b is connected to the material tank 52, the first discharge chute 16, the second discharge chute 17, and the suction nozzle 18, and suctions up the material using negative pressure generated in the vacuum container 531a and sends the material to the vacuum container 531a. The exhaust pipe 531c is connected to the ejector 533 and discharges a gas inside the vacuum container 531a to the ejector 533. A filter 531d is attached to the exhaust pipe 531c to prevent the material from being suctioned up to the ejector 533. The material sent to the vacuum container 531a is discharged from the discharge port 531e and sent to the first switching valve 54. The discharge port 531e can be opened and closed by a bottom lid 531f rotated by an actuator 531g. During transport of the material, the material can be transported with more efficiency by closing the discharge port 531e and sealing the vacuum container 531a. It is preferable to provide a seal member such as a gasket on an abutting surface of the bottom lid 531f.

The ejector 533 is a device that generates negative pressure using the Venturi effect. Specifically, the ejector 533 includes a supply port 533a, an exhaust port 533b, and an intake port 533c. The supply port 533a is connected to a compressed fluid source 25 such as an air compressor via a coupler 623 and thus a compressed fluid is sent to the supply port 533a. The exhaust port 533b discharges the compressed fluid sent to the supply port 533a and the gas inside the vacuum container 531a suctioned from the intake port 533c to the outside of the apparatus. The intake port 533c is connected to a pipeline connecting the supply port 533a and the exhaust port 533b and the exhaust pipe 531c of the vacuum conveyor 531, and suctions the gas inside the vacuum container 531a using negative pressure generated in the ejector 533.

The configuration of the transporter 53 described above is merely an example, and another configuration may be employed as long as it is of a device that can transport the collected material to the highest level of the conveyance route of the material. Negative pressure may be generated using, for example, a vacuum pump, instead of the ejector 533.

Further, when the material inside the chamber 11 is collected using the material supply unit 5, the material is transported together with the inert gas filling inside the chamber 11. Thus, it is desirable to increase the amount of the inert gas supplied to the chamber 11 when the material is collected to prevent the oxygen concentration inside the chamber 11 from becoming lower because of the collection of the material. In the present embodiment, the inert gas supplier 21 can switch the amount of the inert gas supplied and thus the flow rate of the inert gas supplied to the chamber 11 while the transporter 53 operates can be increased. Specifically, the inert gas supplier 21 supplies the nitrogen gas at a rate of 50 L/min in normal times, and supplies the nitrogen gas at a rate of 80 L/min during an operation of the transporter 53.

Preferably, the first switching valve 54 is provided between the transporter 53 and the sieve 55. The first switching valve 54 selectively switches a discharge destination of the material fed from the transporter 53 to any one of the sieve 55 and the material tank 52 as needed. In the present embodiment, the first switching valve 54 can be electrically controlled and switch the discharge destination of the material according to an instruction from the controller 7.

Figure 10:
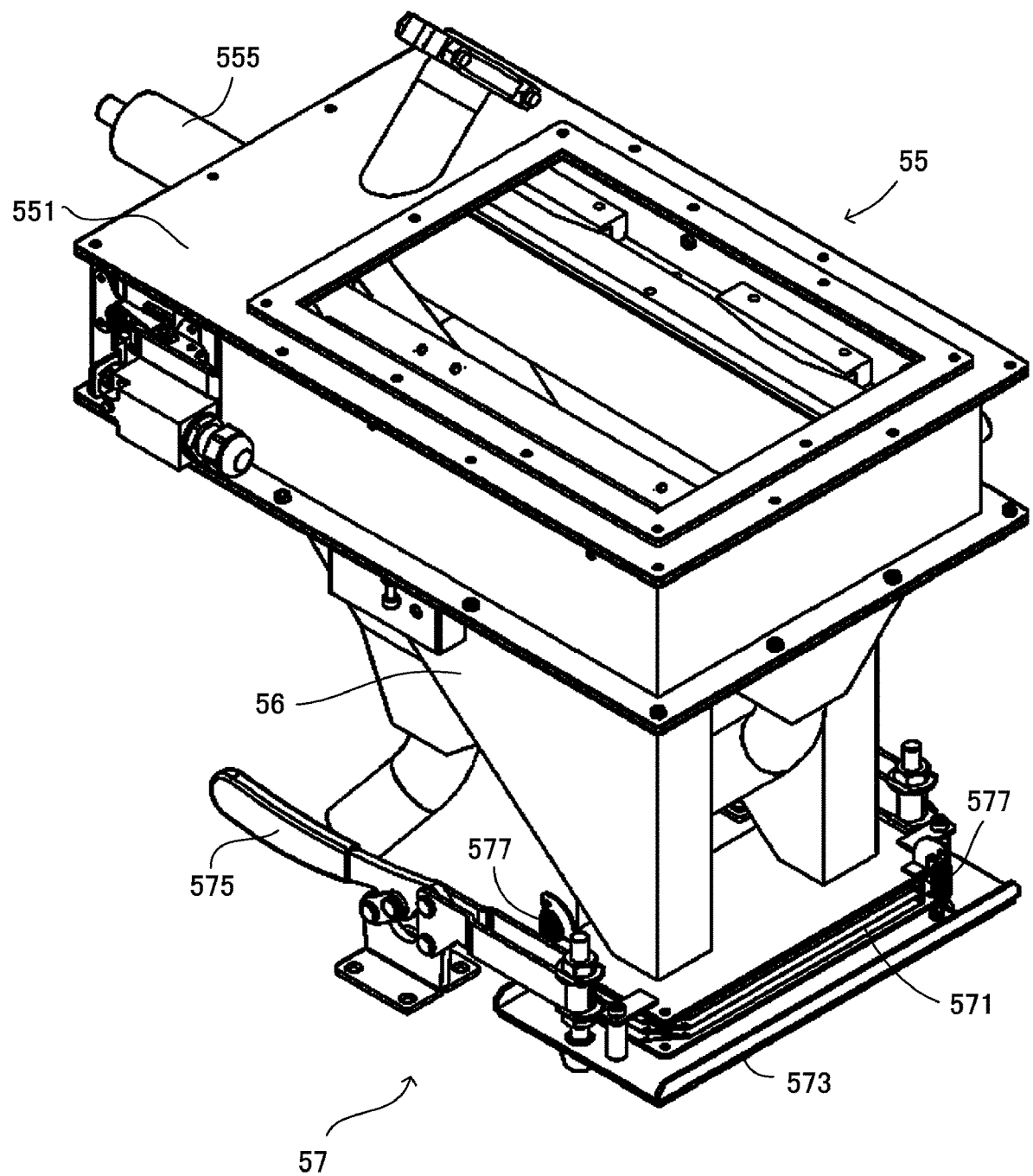
FIG. 10 is a perspective view of a sieve and a connecting member.
Figure 11:
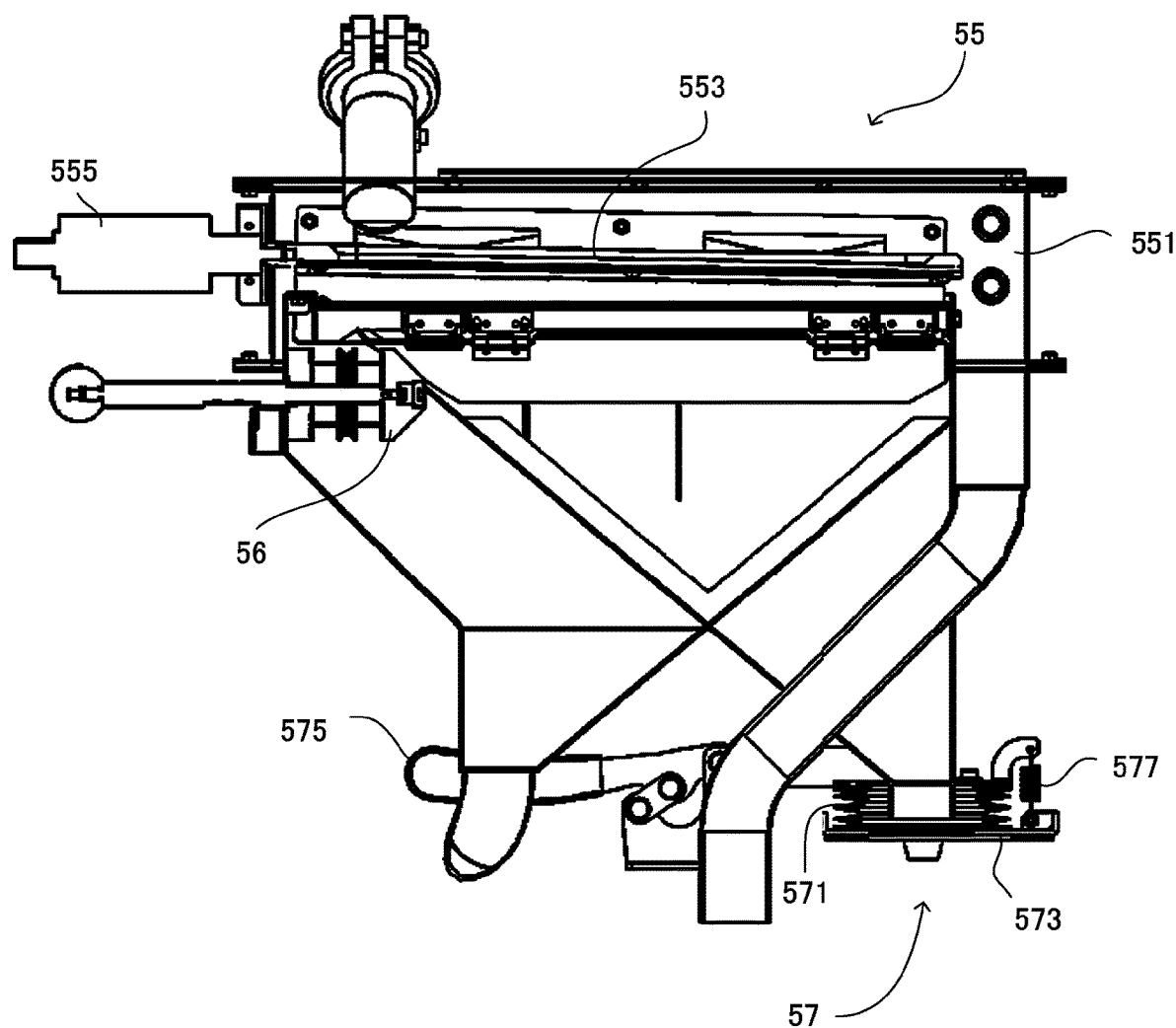
FIG. 11 is a cross-sectional view of the sieve and the connecting member.

The sieve 55 may be provided below the transporter 53 and above the chamber 11. In the present embodiment, the sieve 55 is provided between the first switching valve 54 and the second switching valve 56. The sieve 55 of the present embodiment is specifically an ultrasonic sieve, and includes a filter case 551, a mesh filter 553, and a vibration element 555, as illustrated in FIGS. 10 and 11. The filter case 551 holds the mesh filter 553. The mesh filter 553 sorts the material fed from above, removes impurities therefrom, and discharges the material downward. The mesh filter 553 is vibrated at a predetermined frequency with the vibration element 555. Since the mesh filter 553 is vibrated, clogging is less likely to occur and powder can be sorted over a long time. Further, the mesh filter 553 is disposed to incline downward from an upstream side of the material, that is, a feeding side of the material, toward a downstream side of the material, that is, a discharging side of the material. With this configuration, it is possible to prevent the impurities removed by the mesh filter 553 from continuously remaining on the mesh filter 553, and then the impurities are sent at any time to the downstream side. The mesh filter 553 is set to an appropriate angle according to the length of the portion used for sieving. The inclination angle of the mesh filter 553 in the present embodiment is any angle from one degree to three degrees with respect to a horizontal direction. The impurities that have fallen from an end of the mesh filter 553 on the downstream side are discharged from the sieve 55 and sent to a collection container 557. The configuration of the sieve 55 described above is merely an example, and any device may be used as long as it is a device that can remove the impurities. For example, a three-dimensional sieve may be used as the sieve 55.

Preferably, the second switching valve 56 is provided between the sieve 55 and the chamber 11. The second switching valve 56 selectively switches a discharge destination of the material fed from the sieve 55 to any one of the material tank 52 and the chamber 11 as needed. In the present embodiment, the second switching valve 56 can be manually operated, and the operator switches the discharge destination of the material as needed. Alternatively, the second switching valve 56 can be electrically controlled and may switch the discharge destination of the material according to an instruction from the controller 7.

Figure 12:
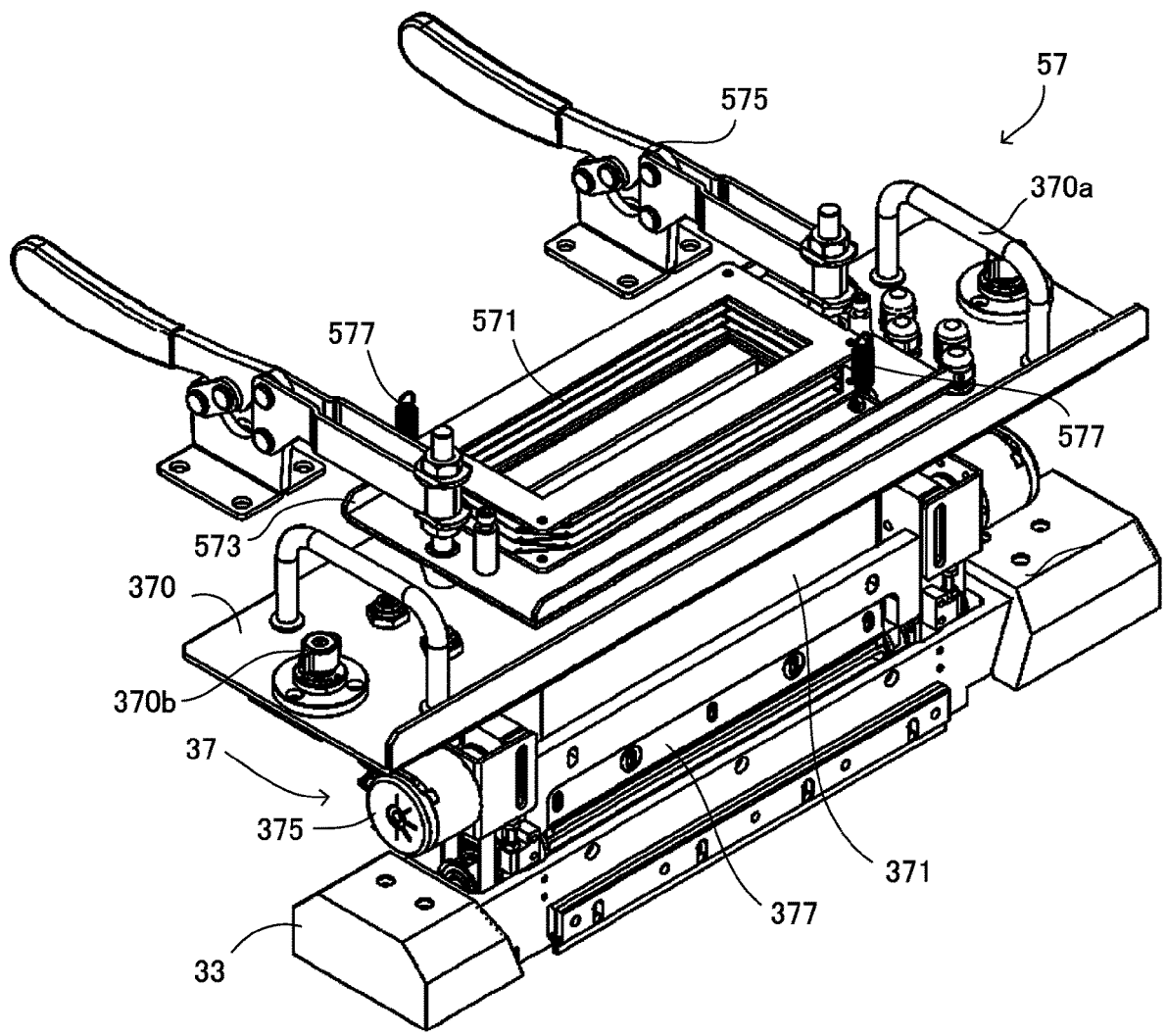
FIG. 12 is a perspective view of the connecting member, a guide member, and the recoater head.
Figure 13:
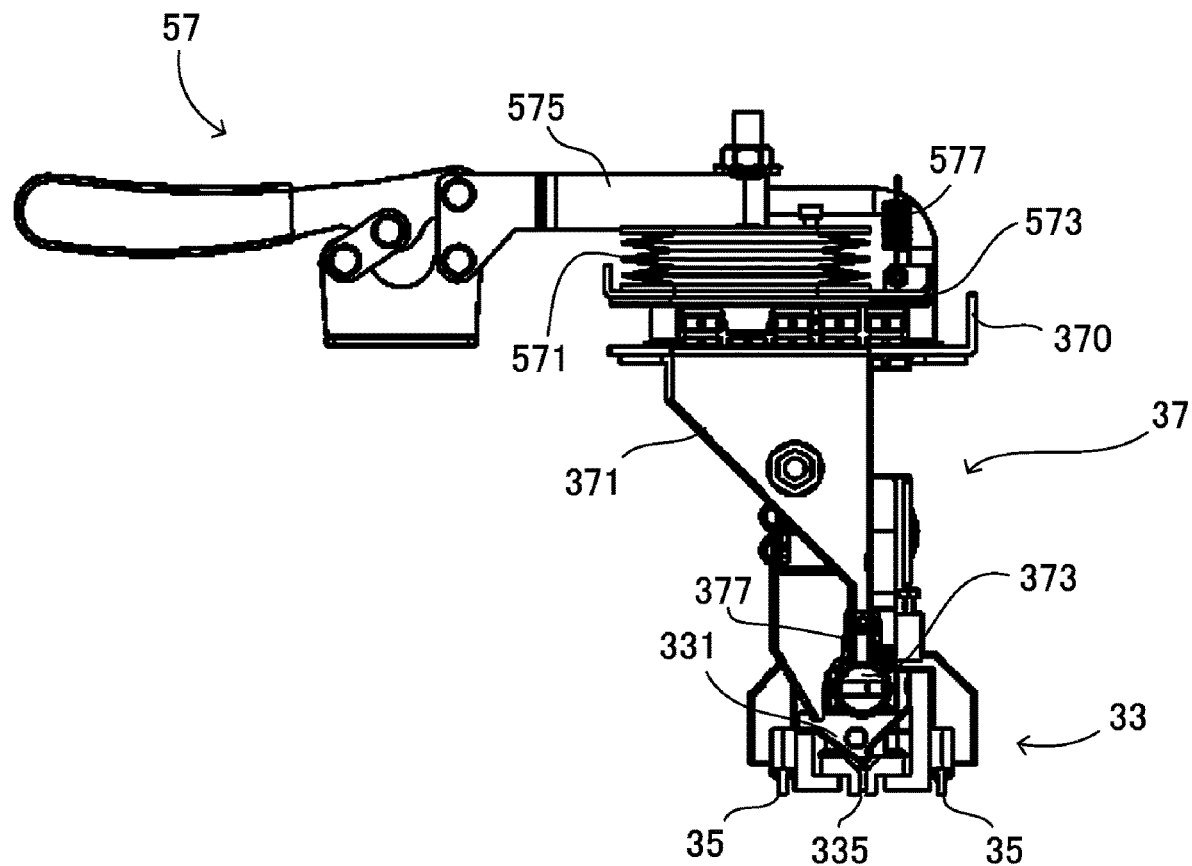
FIG. 13 is a cross-sectional view of the connecting member, the guide member, and the recoater head.

The connection member 57 is provided at an outlet of the material from which the impurities have been removed in the material supply unit 5, that is, between the second switching valve 56 and the chamber 11. As illustrated in FIGS. 12 and 13, the connection member 57 includes a bellows 571, an abutting plate 573, a clamp 575, and a biasing member 577. The bellows 571 is stretchable to enable the material to be flowed, and one end of the bellows 571 is connected to a lower side of the second switching valve 56, and the other end of the bellows 571 is connected to the abutting plate 573. The abutting plate 573 is pressed by the guide member 37 of the additive manufacturing apparatus body 10 to close the conveyance route of the material and prevent the material and the inert gas from leaking. It is preferable to provide a seal member such as a gasket on an abutting surface of the abutting plate 573. The clamp 575 is, for example, a toggle clamp, and fixes the abutting plate 573 in a state of abutting on the guide member 37. The biasing member 577 is, for example, a spring that causes the abutting plate 573 to be separated from the guide member 37 when the clamp 575 is released and contracts the bellows 571. With the connection member 57 described above, the connection of the material supply unit 5 and the additive manufacturing apparatus body 10 at the outlet of the material is easily achieved.

The material supply unit 5 is connected to the other devices via the ferrules 611, 612, and 613, the couplers 621, 622, and 623, the connector 631, and the connection member 57. For this reason, the material supply unit 5 is easily detached from the present additive manufacturing apparatus 1 and further the time required to change the material can be reduced.

According to the material supply unit 5 with the above-described configuration, the collected material is transported to the highest level of the material conveyance route with the one transporter 53, then fed on the sieve 55 by free fall due to gravity and returned to the chamber 11, and thus the apparatus can have a relatively easy configuration and cost can be reduced.

Figure 14:
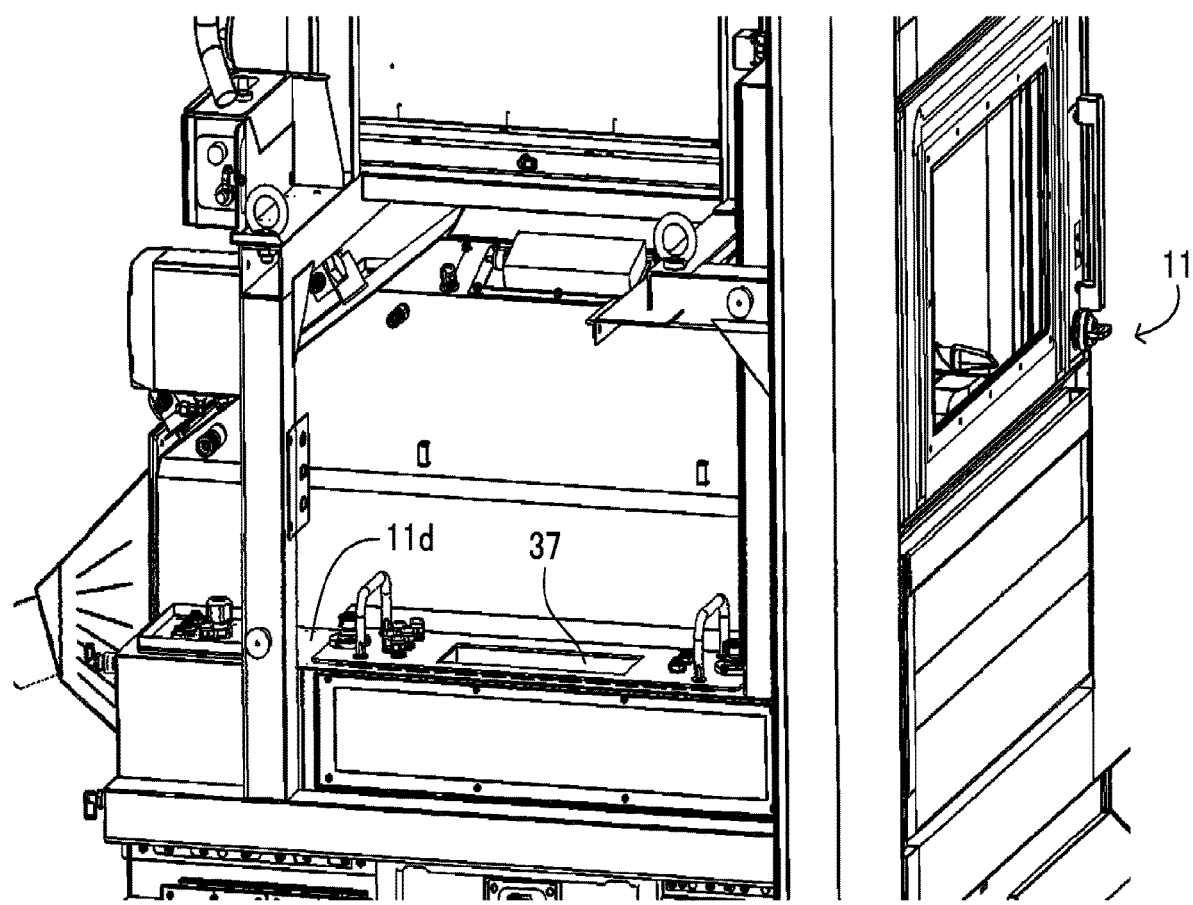
FIG. 14 is a vicinity view of the guide member taken from a side of a chamber.

The material fed from the material supply unit 5 passes through the guide member 37 so that the recoater head 33 of the material layer former 3 is replenished with the material. As illustrated in FIGS. 2 and 14, the guide member 37 is inserted into an opening 11e formed in a top plate 11d of the replenish chamber 11c and fixed to the top plate 11d of the replenish chamber 11c to be detachable. More specifically, in the present embodiment, the guide member 37 is fixed to the top plate 11d of the replenish chamber 11c of the chamber 11 between the molding region R and the discharge opening 311. In other words, the recoater head 33 is replenished with the material in the replenish chamber 11c located between the molding region R and the discharge opening 311. The guide member 37 is removed from the chamber 11 such as during cleaning when the material is changed. In order to make it easier to detach the guide member 37, the guide member 37 is desirably provided at a relatively low position. For this reason, the top plate 11d of the replenish chamber 11c is provided at a position lower than the top plate 11b of the molding chamber 11a.

The guide member 37 includes an upper plate 370, a feed chute 371, a shaft 373, a rotary actuator 375, and wipers 377 as illustrated in FIGS. 12 and 13.

The upper plate 370 is provided at an upper end of the feed chute 371 and is larger than the opening 11e. The upper plate 370 is locked to the top plate 11d to position the guide member 37 at the upper part of the replenish chamber 11c. The upper plate 370 is provided with handles 370a to be easily carried. The upper plate 370 is fixed to the top plate 11d with fixing members 370b such as knob screws.

The feed chute 371 is open upward and downward to enable material to be flowed. The feed chute 371 guides the material fed from an outside of the chamber 11, specifically, from the connection member 57 of the material supply unit 5 to the material container 331 of the recoater head 33. The feed chute 371 extends in the horizontal direction along the material supply port 333 of the recoater head 33.

Figure 15:
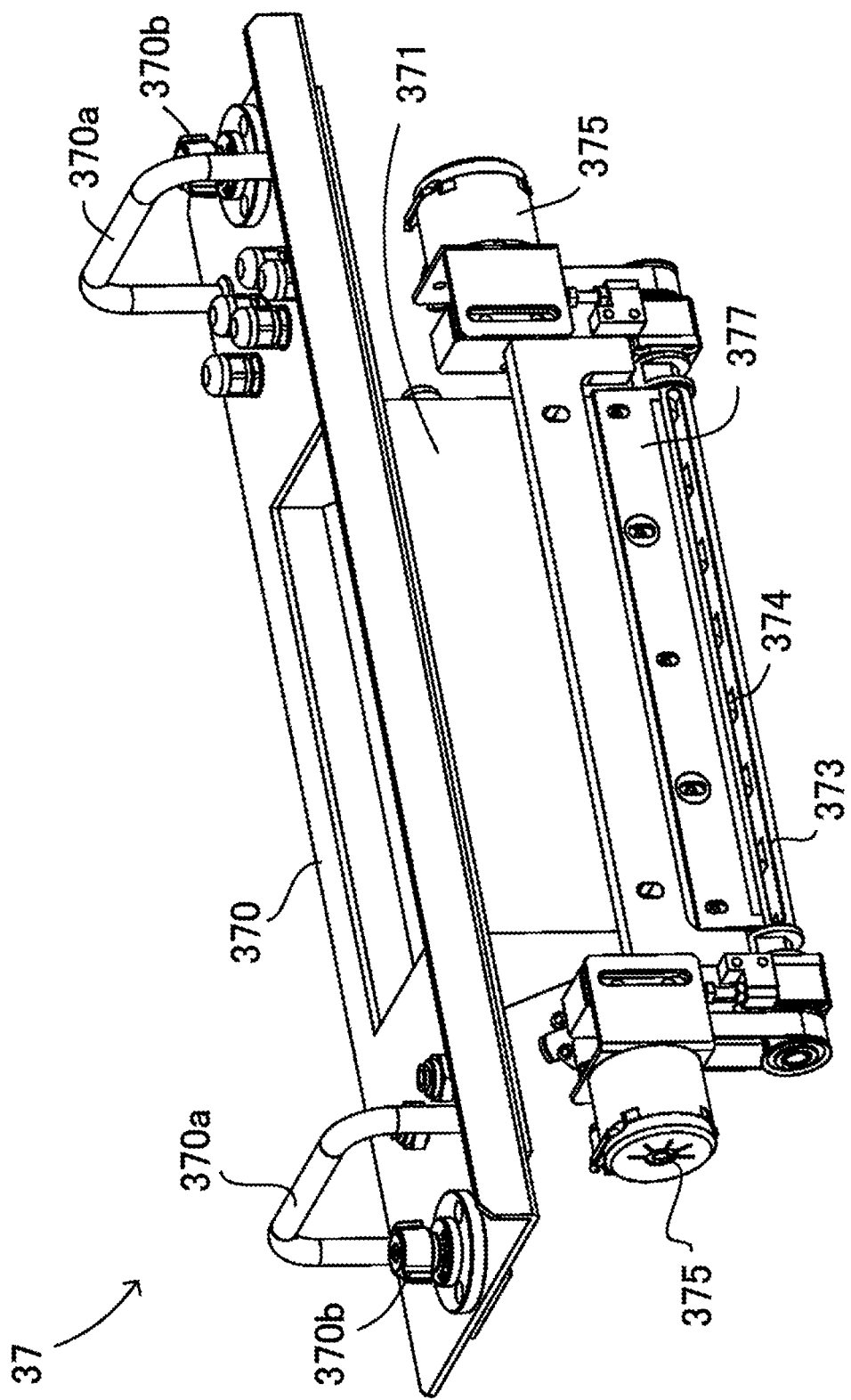
FIG. 15 is a perspective view of the guide member.
Figure 16:
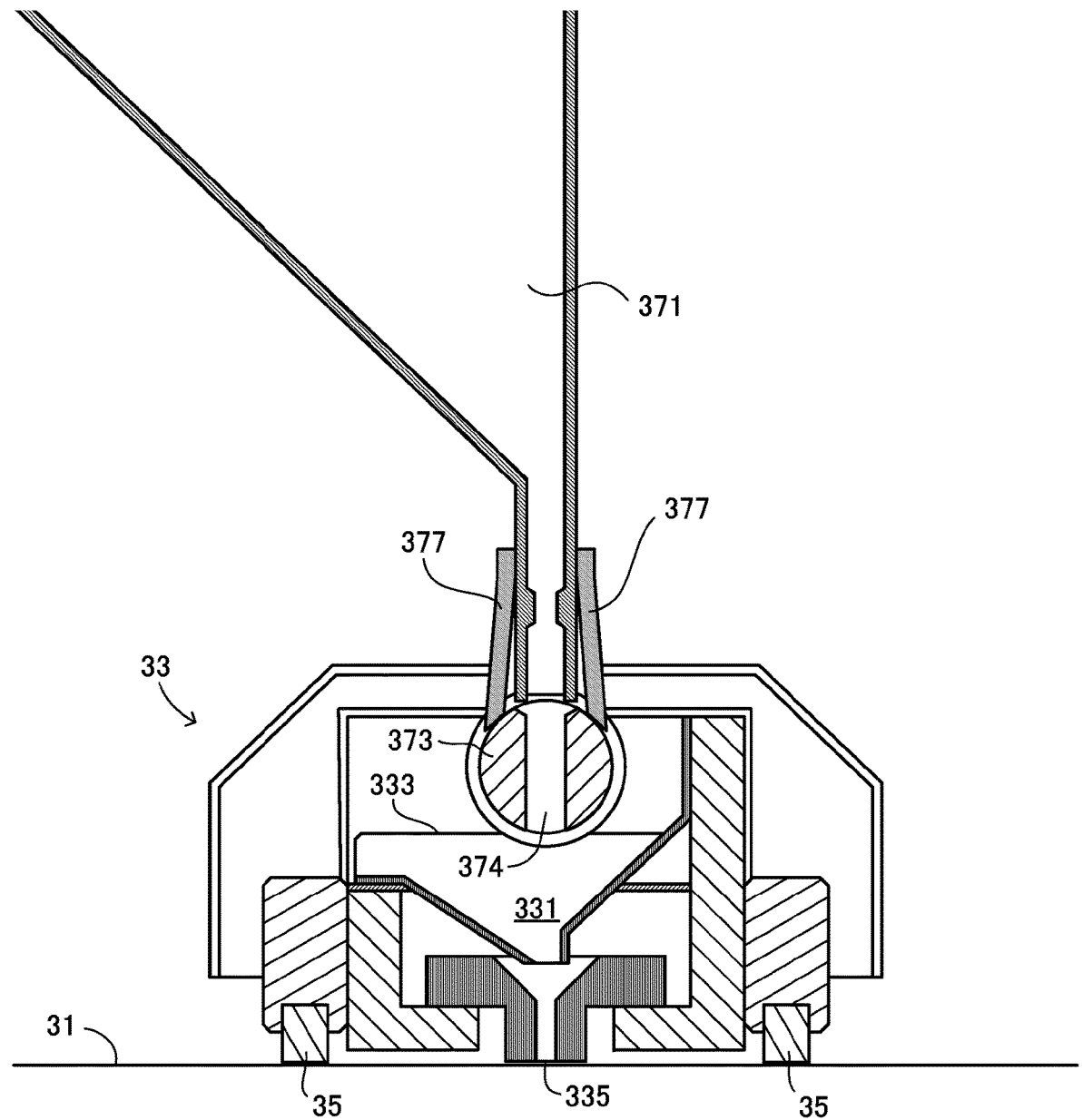
FIG. 16 is a cross-sectional part of the guide member when material is being discharged.
Figure 17:
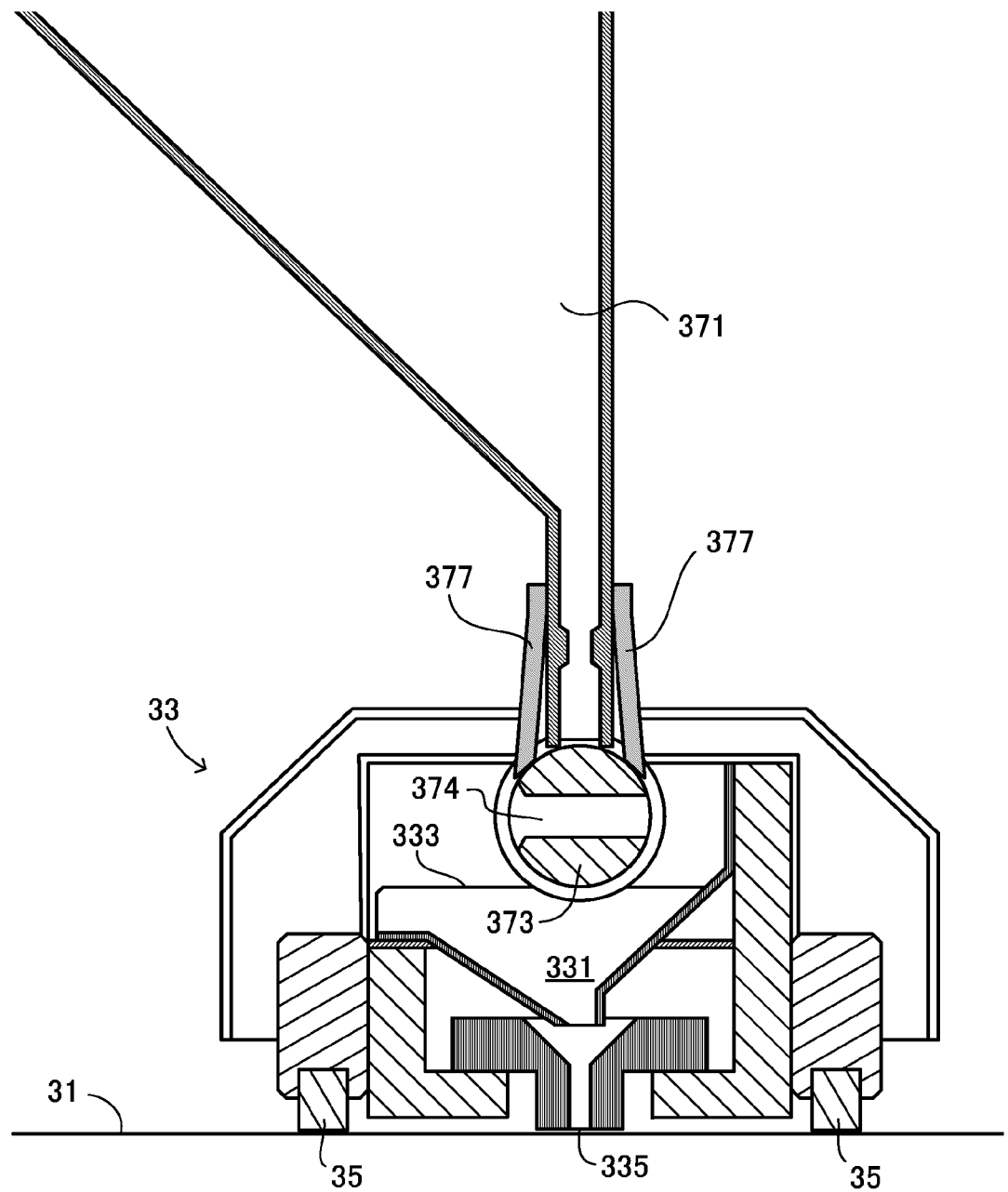
FIG. 17 is a cross-sectional part of the guide member when material is not being discharged.

The shaft 373 is provided to be fixed to the feed chute 371 with a mounting member to shut a lower end portion of the feed chute 371. The shaft 373 extends in the horizontal direction and has through holes 374 formed in a direction orthogonal to an axis of the shaft 373, as illustrated in FIG. 15. Discharge of the material is switched to an on- or off-state according to a rotation of the shaft 373 by the rotary actuator 375. FIG. 16 illustrates the state when the material is supplied, in which the shaft 373 is rotated to make the through holes 374 face in a vertical direction and the material is discharged to the recoater head 33. When replenishment of the recoater head 33 with the material is completed, the through holes 374 is shut by the stored material, which automatically stops discharge of the material. Then, the shaft 373 is rotated to make the through holes 374 face in a horizontal direction, and the lower end portion of the feed chute 371 is closed, as illustrated in FIG. 17.

The wipers 377 are provided at the lower end portion of the feed chute 371 to be in slidable contact with the shaft 373. In the present embodiment, a pair of wipers 377 are provided to interpose the shaft 373 therebetween as illustrated in FIGS. 16 and 17. The wipers 377 prevent the material from leaking from a gap between the feed chute 371 and the shaft 373.

By feeding the material to the recoater head 33 via the guide member 37 as described above, the amount of the material stored in the recoater head 33 can be kept at a certain degree when the recoater head 33 is replenished with the material. In addition, because the shaft 373 and the rotary actuator 375 are used as a discharge switching mechanism that switches the discharge of the material to the on- or off-state, the material is less likely to be jammed therein when the discharge of the material is switched to the on- or off-state. In addition, because the material can be fed from a position close to the recoater head 33, it is possible to suppress flying up of the material. Particularly, because the discharge switching mechanism that switches the discharge of the material to the on- or off-state is configured with the shaft 373 and the rotary actuator 375, the guide member 37 can be configured in a relatively small size.

Particularly, the guide member 37 of the present embodiment is effective especially when it is desired to set the amount of the material contained in the recoater head 33 to be small. If a large amount of the material is stored in the recoater head 33, the discharge amount of the material becomes unstable because of the weight of the material. In addition, if a large amount of the material is stored in the recoater head 33, clogging by the material is more likely to occur. For this reason, it is desirable to set the amount of the material contained in the recoater head 33 to be small. In the present embodiment, a sufficient amount of the material for forming one material layer 83 is supplied from the guide member 37 to the recoater head 33 each time one material layer 83 is formed. The amount of the material stored in the recoater head 33 immediately after replenishment with the material, that is, the maximum amount of the material stored in the recoater head 33, is, for example, equal to or greater than an amount necessary for forming one material layer 83 and less than an amount necessary for forming two material layers 83.

Each part of the additive manufacturing apparatus 1 is provided with an oximeter. For example, a chamber oximeter 661 connected to the chamber 11 and a fume collector oximeter 662 connected to the fume collector 23 are provided. In the present embodiment, a material supply unit oximeter 663 connected to the material supply unit 5 is further provided. Providing the material supply unit oximeter 663 is effective especially when a highly flammable material such as aluminum or titanium is used. The material supply unit oximeter 663 is desirably provided on a relatively downstream of the material conveyance route in the material supply unit 5, and specifically, is connected to the filter case 551 of the sieve 55 in the present embodiment. Because it is estimated that an oxygen concentration on the upstream of a detection position is lower than an oxygen concentration at the detection position, the material supply unit oximeter 663 is connected to the sieve 55 disposed on a relatively downstream on the material conveyance route. The positions and the number of oximeters described above are examples, and any oximeters may be provided in a range in which an oxygen concentration can be detected within the additive manufacturing apparatus 1. For example, only the chamber oximeter 661 may be provided, or only the chamber oximeter 661 and the material supply unit oximeter 663 may be provided.

The controller 7 controls each part and performs control of additive manufacturing including a material replenishing operation and a material collecting operation. Particularly in the present embodiment, the controller 7 controls each part based on the oxygen concentration value detected by each oximeter. Specifically, when an oxygen concentration detected by the oximeter is greater than a predetermined threshold, the controller 7 stops the irradiation device 4 not to form the solidified layer 85 until the oxygen concentration becomes the predetermined threshold or less again. In addition, when an oxygen concentration detected by the oximeter is greater than the predetermined threshold, the controller 7 stops the material supply unit 5 not to collect the material until the oxygen concentration becomes the predetermined threshold or less again. In a case in which a plurality of oximeters is provided and at least one oximeter measures an oxygen concentration exceeding the predetermined threshold, collecting the material is avoided. In other words, the transporter 53 of the material supply unit 5 of the present embodiment is configured to operate only when the oxygen concentrations of the inside of the chamber 11, the inside of the fume collector 23, and the material supply unit 5 are the predetermined threshold or less. In the present embodiment, the threshold of the oxygen concentration is, for example, 3%. With the above-described control, the material can be prevented from being degraded and molded more safely. The controller 7 may be configured by optionally combining hardware and software, and includes, for example, a CPU, a RAM, a ROM, an auxiliary storage device, and an input/output interface.

Each part of the additive manufacturing apparatus 1 is desirably provided with a material sensor that detects the presence or absence of the material. Specifically, in the present embodiment, a material sensor 671 is provided for the recoater head 33, a material sensor 672 is provided for the guide member 37, a material sensor 673 is provided for the first discharge chute 16, a material sensor 674 is provided for the second discharge chute 17, material sensors 675 and 676 are provided for the material tank 52, and a material sensor 677 is provided for the collection container 557. Each of the material sensors 671, 672, 673, 674, 675, 676, and 677 is electrically connected to the controller 7, and sends detection signals indicating detection results to the controller 7. The material sensor 671 detects whether a sufficient amount of the material is stored in the material container 331 of the recoater head 33. The material sensor 672 detects whether a sufficient amount of the material is stored in the feed chute 371 of the guide member 37. The material sensor 673 detects whether a sufficient amount of the material is stored in the first discharge chute 16. The material sensor 674 detects whether a sufficient amount of the material is stored in the second discharge chute 17. The material sensors 675 and 676 are provided an upper part and a lower part of the material tank 52, respectively. When the material sensor 675 detects that the material is above an upper limit position of the material tank 52, a warning is displayed on the display device 73. When the material sensor 676 detects that the material is below a lower limit position of the material tank 52, a warning is displayed on the display device 73. The material sensor 677 is provided at an upper part of the collection container 557. When the material sensor 677 detects that the material is above an upper limit position of the collection container 557, a warning is displayed on the display device 73.

Here, an additive manufacturing method performed using the above-described additive manufacturing apparatus 1 will be described. First, the base plate 81 is placed on the molding table 14, and the inside of the chamber 11 is filled with the inert gas at the predetermined concentration. Then, the height of the molding table 14 is adjusted to a proper position. In this state, the recoater head 33 moves on the molding region R and discharges material on the molding region R. The material is leveled by the blades 35 and thereby the first material layer 83 is formed on the base plate 81. The recoater head 33 moves to the replenish chamber 11c to receive replenishment of the material from the material supply unit 5 via the guide member 37. Next, the irradiation device 4 irradiates an irradiation region of the first material layer 83 with the laser beam L. The laser beam L sinters or melts the material within the irradiation region to form a first solidified layer 85. Then, the molding table 14 is lowered as much as the thickness of the material layer 83, the recoater head 33 is moved on the molding region R to form a second material layer 83 on the first solidified layer 85. The recoater head 33 moves to the replenish chamber 11c to receive replenishment with the material from the material supply unit 5 via the guide member 37. The irradiation device 4 irradiates the second material layer 83 with the laser beam L to form a second solidified layer 85. Third and thereafter material layers 83 and solidified layers 85 are formed by repeating the same procedures, a plurality of solidified layers 85 is laminated, and thereby the desired three-dimensional molded object is formed. Further, the replenishment of the recoater head 33 with the material and the formation of the solidified layers 85 may be performed in parallel.

Figure 18:
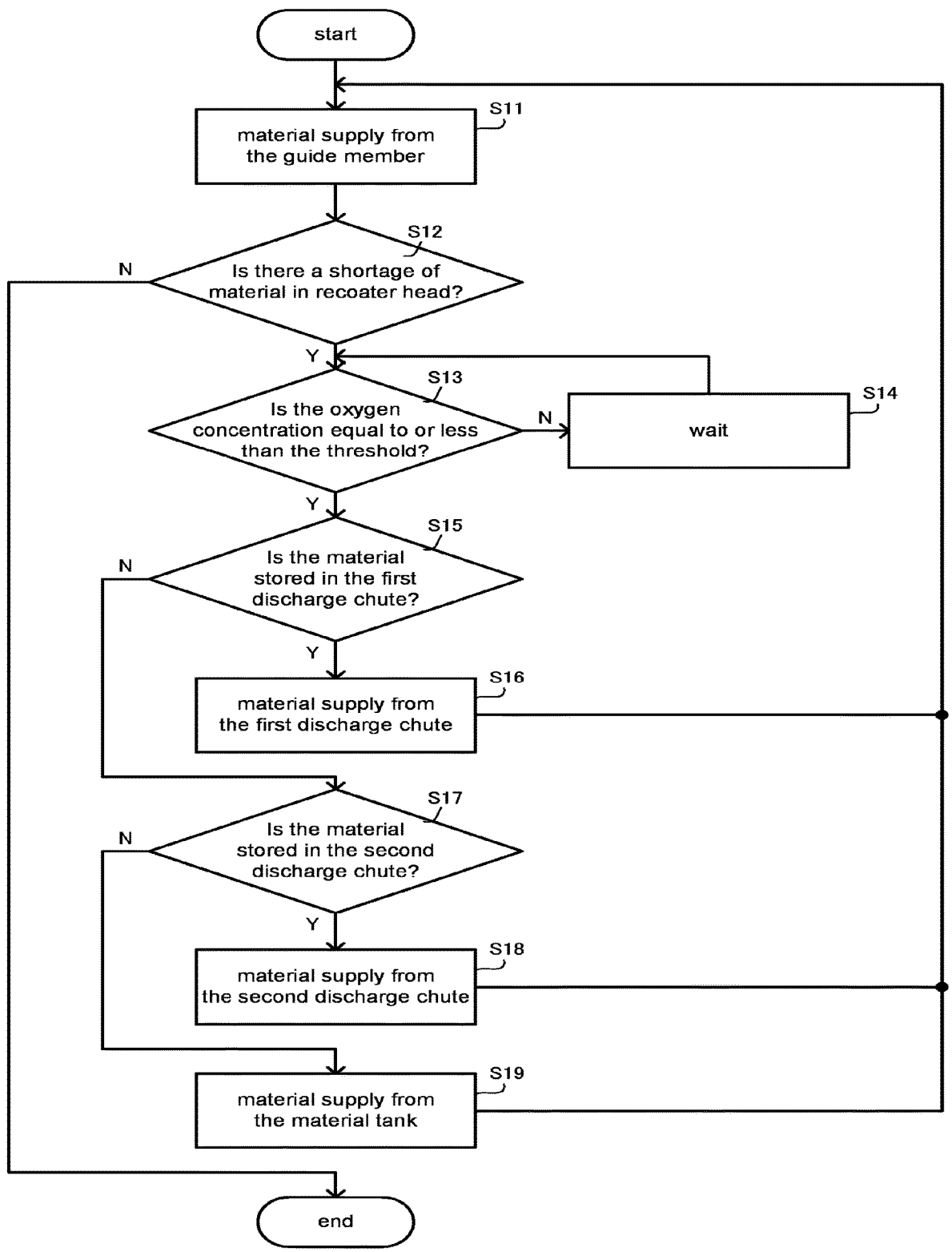
FIG. 18 is a flowchart showing an example of a material replenishing operation during additive manufacturing.

Here, an example of the material replenishing operation during additive manufacturing will be described in detail with reference to FIG. 18. Each time a predetermined number of material layers 83 is formed, i.e., each time one material layer 83 is formed in the present embodiment, the recoater head 33 is moved to the replenish chamber 11c, and the material replenishing operation with respect to the material container 331 of the recoater head 33 is started. Further, it may be configured that the material replenishing operation is started when the material sensor 671 detects that a predetermined amount of the material or less is present in the material container 331. In addition, even in a configuration in which the material replenishing operation is performed each time a predetermined number of material layers 83 are formed, when the material sensor 671 detects that a predetermined amount of the material or less is present in the material container 331 during the formation of the material layers 83, the formation of the material layers 83 may be stopped, and the formation of the material layers 83 may be performed again after the material replenishing operation is performed. Further, the material discharge destination of the first switching valve 54 is set to the sieve 55, and the material discharge destination of the second switching valve 56 is set to the chamber 11.

First, the shaft 373 of the guide member 37 is rotated, and the material stored in the feed chute 371 is fed to the recoater head 33 (S11). If the material sensor 671 detects that the recoater head 33 has been replenished with a sufficient amount of material (No in S12), the material replenishing operation ends, and the formation of material layers 83 and solidified layers 85 is resumed. If the material sensor 672 detects that the material inside the feed chute 371 has been substantially consumed and thus the material inside the recoater head 33 is insufficient (Yes in S12), the excess material in the chamber 11 is collected and an operation to replenish the recoater head 33 is performed.

First, the oxygen concentrations inside the additive manufacturing apparatus 1 are measured by the chamber oximeter 661, the fume collector oximeter 662, and the material supply unit oximeter 663, and whether the oxygen concentrations are equal to or less than a predetermined threshold is determined (S13). If the oxygen concentrations exceed the predetermined threshold, the additive manufacturing apparatus waits until the concentrations are equal to or less than the threshold (S14).

Next, the material sensor 673 checks whether the material is stored in the first discharge chute 16, and if there is the material in the first discharge chute (Yes in S15), the material is supplied from the first discharge chute 16 (S16). Specifically, with the valve 642 opened and the valves 641, 643, and 644 closed, the compressed fluid is supplied from the compressed fluid source 25 to the ejector 533 of the transporter 53. At this time, it is desirable to increase the amount of the inert gas supplied from the inert gas supplier 21. The material suctioned up by the transporter 53 passes through the first switching valve 54, the sieve 55, the second switching valve 56, and the connection member 57, and falls to the guide member 37. The material is supplied from the guide member 37 again (S11), and if the recoater head 33 is replenished with a sufficient amount of the material (No in S12), the material replenishing operation ends. If the amount of material in the recoater head 33 is still insufficient even after the material is supplied from the first discharge chute 16 (Yes in S12) or if there is not a sufficient amount of material in the first discharge chute 16 (No in S15), the material is supplied from the second discharge chute 17.

After whether the oxygen concentrations inside the additive manufacturing apparatus 1 are equal to or less than the predetermined threshold is determined as described above, the material sensor 674 determines whether the material is stored in the second discharge chute 17, and if there is the material in the second discharge chute (Yes in S17), the material is supplied from the second discharge chute 17 (S18). Specifically, with the valve 643 opened and the valves 641, 642, and 644 closed, the compressed fluid is supplied from the compressed fluid source 25 to the ejector 533 of the transporter 53. At this time, it is desirable to increase the amount of the inert gas supplied from the inert gas supplier 21. The material suctioned up by the transporter 53 passes through the first switching valve 54, the sieve 55, the second switching valve 56, and the connection member 57, and falls to the guide member 37. The material is supplied from the guide member 37 again (S11), and if the recoater head 33 is replenished with a sufficient amount of the material (No in S12), the material replenishing operation ends. If the amount of material in the recoater head 33 is still insufficient even after the material is supplied from the second discharge chute 17 (Yes in S12) or if there is not a sufficient amount of the material in the second discharge chute 17 (No in S17), the material is supplied from the material tank 52.

After it is determined whether the oxygen concentrations inside the additive manufacturing apparatus 1 are equal to or less than the predetermined threshold as described above, the material is supplied from the material tank 52 (S19). Specifically, with the valve 641 opened and the valves 642, 643, and 644 closed, the compressed fluid is supplied from the compressed fluid source 25 to the ejector 533 of the transporter 53. At this time, it is desirable to increase the amount of the inert gas supplied from the inert gas supplier 21. The material suctioned up by the transporter 53 passes through the first switching valve 54, the sieve 55, the second switching valve 56, and the connection member 57, and falls to the guide member 37. The material is supplied from the guide member 37 again (S11), and if the recoater head 33 is replenished with a sufficient amount of the material (No in S12), the material replenishing operation ends.

As described above, the material is collected from the chamber 11 via the first discharge chute 16 and the second discharge chute 17 during the additive manufacturing, and the collected material or the material stored in the material tank 52 is sieved every time and supplied to the recoater head 33.

Figure 19:
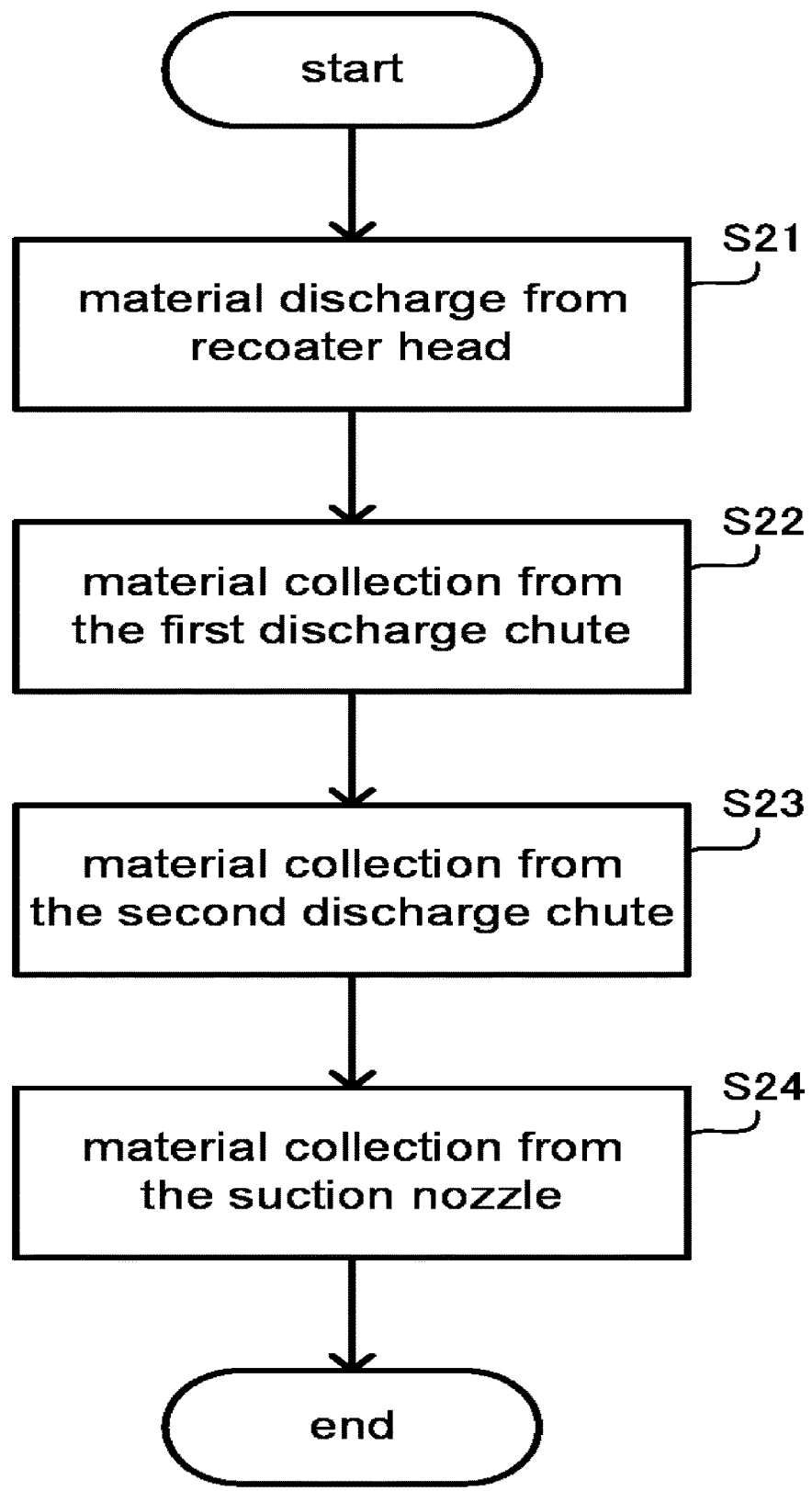
FIG. 19 is a flowchart showing an example of a material collecting operation after additive manufacturing.

Here, an example of the material collecting operation after additive manufacturing will be described in detail with reference to FIG. 19. The material discharge destination of the first switching valve 54 is set to the material tank 52. In addition, it is desirable to maintain the oxygen concentrations inside the additive manufacturing apparatus 1 at the predetermined threshold or lower during the material collecting operation as well.

First, the recoater head 33 is moved to above the discharge opening 311 or the discharge opening 313, and the material inside the material container 331 is discharged to the first discharge chute 16 or the second discharge chute 17 (S21). Next, the material is collected from the first discharge chute 16 (S22). Specifically, with the valve 642 open and the valves 641, 643, and 644 closed, the compressed fluid is supplied from the compressed fluid source 25 to the ejector 533 of the transporter 53. The material inside the first discharge chute 16 is suctioned up by the transporter 53, passes through the first switching valve 54, and is sent to the material tank 52. Next, the material is collected from the second discharge chute 17 (S23). Specifically, with the valve 643 opened and the valves 641, 642, and 644 closed, the compressed fluid is supplied from the compressed fluid source 25 to the ejector 533 of the transporter 53. The material of the second discharge chute 17 is suctioned up by the transporter 53, passes through the first switching valve 54, and is sent to the material tank 52. Then, the material is collected from the suction nozzle 18 (S24). Specifically, the operator moves the suction nozzle 18 to a desired position inside the chamber 11 through the glove box. With the valve 644 opened and the valves 641, 642, and 643 closed in that state, the compressed fluid is supplied from the compressed fluid source 25 to the ejector 533 of the transporter 53. The material is suctioned up from the suction nozzle 18 by the transporter 53, passes through the first switching valve 54, and is sent to the material tank 52.

As described above, the material is collected from the chamber 11 via the first discharge chute 16, the second discharge chute 17, and the suction nozzle 18 after additive manufacturing. Because an amount of the material collected after additive manufacturing is generally large, it takes quite a time to remove the impurities from the material using the sieve 55. Thus, in the present embodiment, the collected material is sent directly to the material tank 52 without sieving it. In the material supply unit 5 of the present embodiment, the sieve 55 is disposed on a downstream side of the conveyance route from the material tank 52. For this reason, even if the material mixed with the impurities is discharged from the material tank 52 during additive manufacturing, the material is sent to the recoater head 33 after removing the impurities. However, the material discharge destination of the first switching valve 54 may be set to the sieve 55, the material discharge destination of the second switching valve 56 may be set to the material tank 52, and the collected material may be sieved and then sent to the material tank 52.

The material replenishing operation and the material collecting operation described above are merely examples, and the orders of the steps may be changed, or the flow path may be appropriately switched as needed. In addition, the material may be transported after the material discharge destination of the first switching valve 54 is set to the sieve 55 and the material discharge destination of the second switching valve 56 is set to the material tank 52, and the material discharged from the second switching valve 56 may be returned to a material bottle manually by removing the ferrule 614 connecting the second switching valve 56 and the material tank 52.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An additive manufacturing apparatus comprising:
    a chamber that covers a molding region in which a desired three-dimensional molded object is formed,
    wherein the chamber comprises:
        a molding chamber in which the molding region is positioned, and
        a replenish chamber having a top plate on which an opening is formed;
    a material layer former comprising a base on which the molding region is present, a recoater head that moves on the base in a horizontal direction while discharging material stored therein, and a blade that is attached to the recoater head to level the material to form a material layer,
    wherein the recoater head comprises:
        a material container that stores the material,
        a material supply port that is provided on an upper surface of the material container and serves as a reception port for the material supplied to the material container, and
        a material discharge port that is provided at a bottom of the material container and discharges the material to the molding region; and
    a guide member, which supplies the material to the recoater head, in the replenish chamber, comprising:
        an upper plate which is larger than the opening formed on the top plate of the replenish chamber, and is configured to be locked to the top plate,
        a feed chute that is open upward and downward which is configured to enable the material supplied from an outside of the chamber to be flowed, wherein the feed chute is provided at an under surface of the upper plate,
        a shaft which extends in the horizontal direction, and has a through hole formed in a direction orthogonal to an axis, wherein the shaft is provided to shut a lower end portion of the feed chute;
        a rotary actuator that rotates the shaft; and
        a wiper that is provided at the lower end portion of the feed chute and is in slidable contact with an upper portion of the shaft,
    wherein a discharge of the material from the guide member to the recoater head is switched to an on- or off-state by rotating the shaft, and
    wherein the guide member is configured to be detachably inserted into the opening and fixed to the top plate of the replenish chamber.

2. The additive manufacturing apparatus according to claim 1,
    wherein the supply of the material from the guide member to the recoater head is performed at least each time one material layer is formed.

3. The additive manufacturing apparatus according to claim 2,
    wherein a maximum amount of the material stored in the recoater head is equal to or greater than an amount for forming one of the material layer and less than an amount for forming two of the material layer.

4. The additive manufacturing apparatus according to claim 1, wherein the top plate of the replenish chamber is provided at a position lower than a top plate of the molding chamber.

* * * * *